US010208721B2

(12) United States Patent
Schallauer et al.

(10) Patent No.: US 10,208,721 B2
(45) Date of Patent: Feb. 19, 2019

(54) METHOD AND SYSTEM FOR MANUFACTURING A FAMILY OF INTAKE MANIFOLDS FOR A FAMILY OF INTERNAL COMBUSTION ENGINES

(71) Applicant: BRP-ROTAX GMBH & CO. KG, Gunskirchen (AT)

(72) Inventors: Martin Schallauer, Gunskirchen (AT); Christian Stiebinger, Buchkirchen (AT); Hermann Neubacher, Taiskirchen (AT); Michael Sauer, Wels (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 15/459,057

(22) Filed: Mar. 15, 2017

(65) Prior Publication Data
US 2018/0266372 A1    Sep. 20, 2018

(51) Int. Cl.
*F02M 35/104*    (2006.01)
*F02M 35/10*    (2006.01)
(Continued)

(52) U.S. Cl.
CPC ......... *F02M 35/104* (2013.01); *B29C 45/006* (2013.01); *B29C 65/06* (2013.01); *F02M 35/10216* (2013.01); *B29L 2031/7492* (2013.01)

(58) Field of Classification Search
CPC ................. B22D 25/02; F02M 35/104; F02M 35/10216; B29C 65/06; B29C 45/006
See application file for complete search history.

(56) References Cited

U.S. PATENT DOCUMENTS

| 6,533,568 B1 | 3/2003 | Kosicki |
| 6,581,561 B1 | 6/2003 | Brodesser et al. |

(Continued)

FOREIGN PATENT DOCUMENTS

| DE | 2034312 A1 | 1/1972 |
| JP | 11166457 A | 6/1999 |

OTHER PUBLICATIONS

European Search Report issued from the EPO in connection with Patent Application No. 17161925.7; Maarten Alink.

(Continued)

*Primary Examiner* — Jacob J Cigna
*Assistant Examiner* — Lee A Holly
(74) *Attorney, Agent, or Firm* — BCF LLP

(57) ABSTRACT

A family of manifolds for a family of engines. A first and second engine respectively have a first and second number of cylinders. The second number is at least one and smaller than the first number. Each manifold has a plenum chamber and an inlet. The first and second manifolds respectively have the first and second number of outlets, each connected to one of a first number of runner passages. The first manifold is manufactured by inserting an outlet insert for forming at least one of the first number of outlets into a first or second mold, forming a first portion thereof using the first mold, forming a second portion thereof using the second mold, and connecting the portions. The second manifold is manufactured by forming a first portion thereof using the first mold, forming a second portion thereof using the second mold, and connecting the portions.

12 Claims, 31 Drawing Sheets

(51) Int. Cl.
*B29C 45/00* (2006.01)
*B29C 65/06* (2006.01)
*B29L 31/00* (2006.01)

(56) References Cited

U.S. PATENT DOCUMENTS

| | | | |
|---|---|---|---|
| 2002/0043234 A1* | 4/2002 | Homi | F02M 35/10026 |
| | | | 123/184.42 |
| 2004/0154574 A1 | 8/2004 | Menin | |
| 2005/0279312 A1 | 12/2005 | Park | |
| 2010/0225106 A1 | 9/2010 | Newman et al. | |
| 2011/0169186 A1* | 7/2011 | Bruman | B22D 25/02 |
| | | | 264/138 |
| 2017/0045021 A1 | 2/2017 | Foreman | |

OTHER PUBLICATIONS

Don Sherman, "Block Party: Creating a V-6 by Declaring Two Cylinders Redundant", Apr. 12, 2016, retrieved from URL:http://blog.caranddriver.com/block-party-creating-a-v-6-by-declaring-two-cylinders-redundant/ on Sep. 18, 2017.

English Translation of Abstract of JPH11166457 received from the EPO.

English Machine Translation of DE2034312A1 retrieved from http://translationportal.epo.org/ on Sep. 18, 2018.

\* cited by examiner

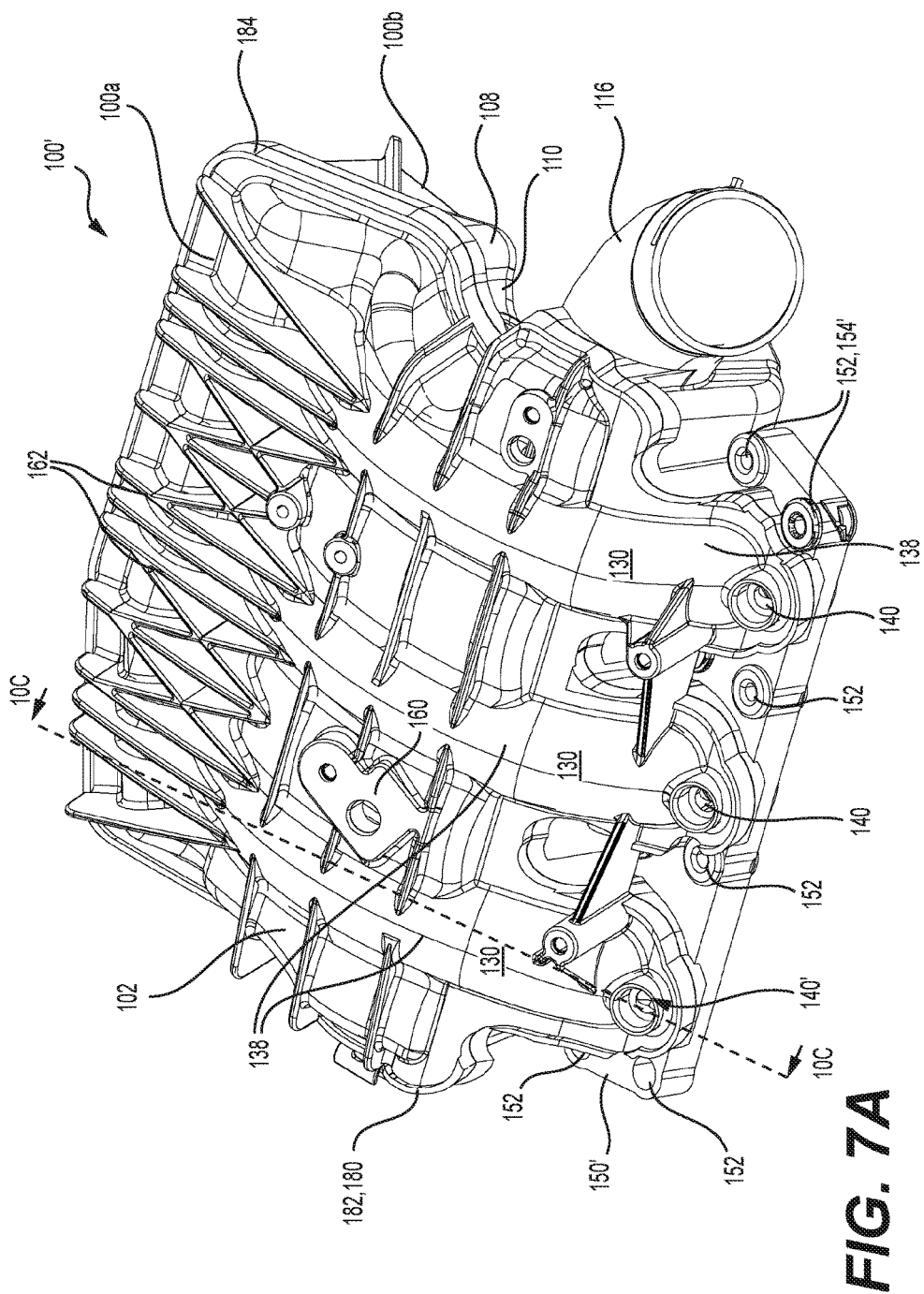

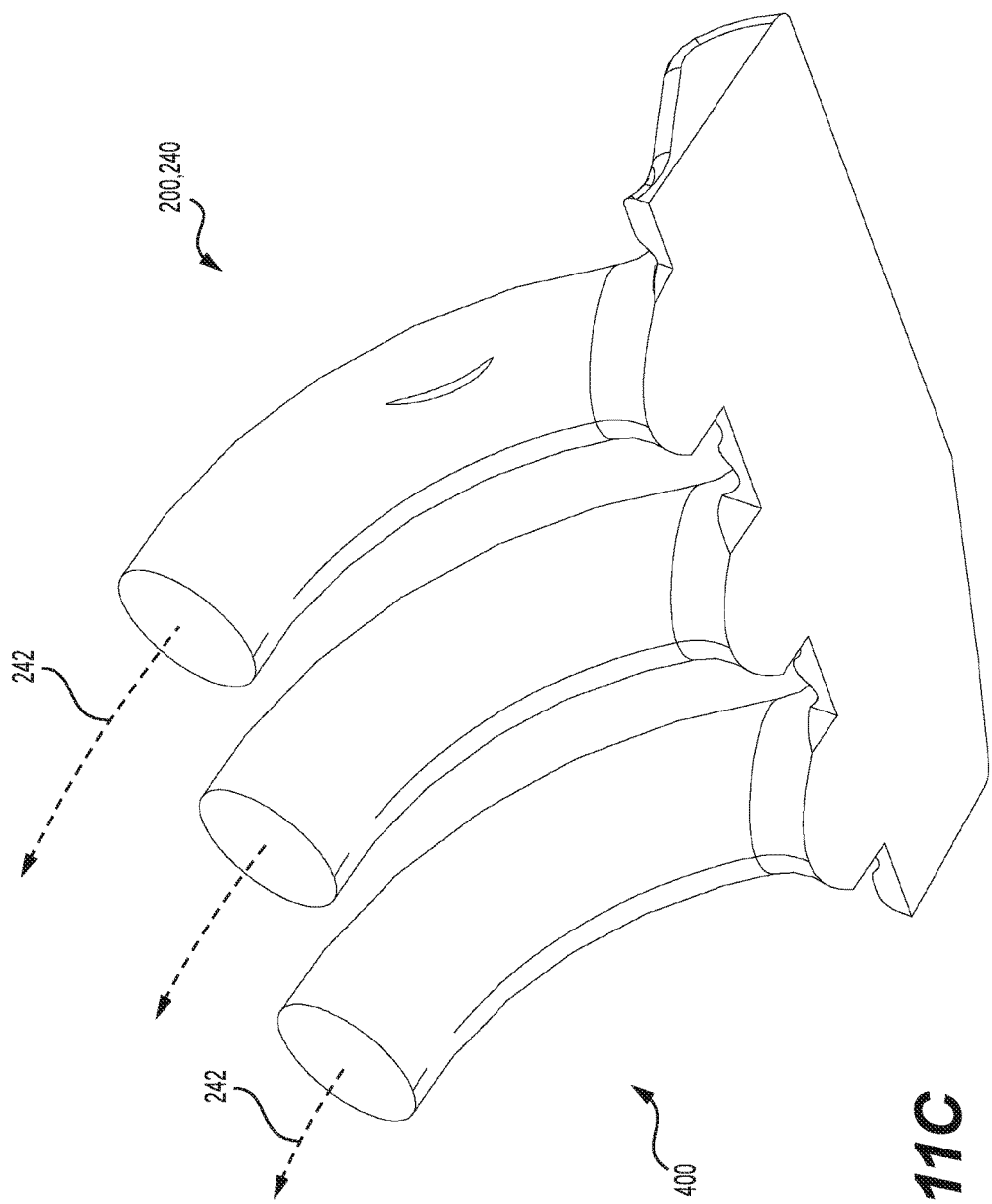

METHOD AND SYSTEM FOR MANUFACTURING A FAMILY OF INTAKE MANIFOLDS FOR A FAMILY OF INTERNAL COMBUSTION ENGINES

FIELD OF TECHNOLOGY

The present technology relates to intake manifolds for internal combustion engines, and to methods and systems for manufacturing thereof.

BACKGROUND

Intake manifolds are complex structures that are typically designed for specific engines. Assembly of intake manifolds and installation thereof on engines can also be complicated, especially when the intake manifold is comprised of many components. Typically, intake manifolds for engines are manufactured using molds which are generally expensive to produce. It is common to have different molds which have been specially designed for specific engines. Thus, manufacturing intake manifolds for different engines typically requires different molds. Alternatively, intake manifolds are constructed to be modular which however increases the time and complexity involved in assembly and installation of an intake manifold on a particular engine.

It would therefore be greatly desirable to be able to manufacture intake manifolds for different engines without incurring the high costs involved in retooling the molding systems. It would also be desirable to reduce complexity of assembly of intake manifolds and installation thereof onto engines.

SUMMARY

It is an object of the present technology to ameliorate at least some of the inconveniences mentioned above.

In accordance with one aspect of the present technology, there is provided a method for manufacturing a family of intake manifolds including at least a first air intake manifold and a second air intake manifold for a family of engines including at least a first engine and a second engine. The first engine including a first number of cylinders. The second engine includes a second number of cylinders, the second number being smaller than the first number, and the second number being at least one. The first intake manifold is configured for the first engine. The first intake manifold has a plenum chamber, a plenum chamber air inlet, the first number of intake runner passages, and the first number of outlets. Each of the outlets is fluidly connected to a corresponding one of the first number of intake runner passages and configured for fluid connection to a corresponding one of the first number of cylinders. The second intake manifold is configured for the second engine. The second intake manifold includes the plenum chamber, the plenum chamber air inlet, the first number of intake runner passages, and at least the second number of outlets. Each of the second number of outlets is fluidly connected to a corresponding one of the first number of intake runner passages and configured for fluid connection to a corresponding one of the second number of cylinders. At least one of the first number of intake runner passages of the second intake manifold is not fluidly connected to any one of the second number of outlets of the second intake manifold. The method includes: providing a first intake mold for forming a first portion of each one of the first and second intake manifolds including a first portion of the plenum chamber and providing a second intake mold for forming a second portion of each one of the first and second intake manifolds including a second portion of the plenum chamber. One of the first and second intake molds has an outlet insert for forming at least one of the first number of outlets of the first intake manifold. The first intake manifold is manufactured by inserting the outlet insert into the corresponding one of the first and second intake molds, forming the first portion of the first intake manifold including the first portion of the plenum chamber using the first intake mold, forming the second portion of the first intake manifold including the second portion of the plenum chamber using the second intake mold, and connecting the first portion of the first intake manifold to the second portion of the first intake manifold to from the first intake manifold configured for the first engine. The second intake manifold is manufactured by forming the first portion of the second intake manifold including the first portion of the plenum chamber using the first intake mold, forming the second portion of the second intake manifold including the second portion of the plenum chamber using the second intake mold, and connecting the first portion of the second intake manifold to the second portion of the second intake manifold to from the second intake manifold configured for the second engine.

In some implementations, the outlet insert is a first outlet insert configured for defining at least one of the first number of outlets of the first intake manifold. One of the first and second intake molds further includes a second outlet insert configured for defining at least one of the second number of outlets of the second intake manifold, the second outlet insert being different from the first outlet insert. Manufacturing the second intake mold further includes inserting the second outlet insert into the corresponding one of the first and second intake molds before forming the corresponding one of the first and second portions of the second intake manifold using the corresponding one of the first and second intake molds.

In some implementations, the second intake manifold further includes at least one closed outlet corresponding to one of the first number of intake runner passages and configured to block connection of the corresponding one of the first number of intake runner passages to any one of the second number of cylinders. The second outlet insert is includes a closed outlet insert for defining the at least one closed outlet.

In some implementations, the first intake manifold includes the first number of fuel injector ports, each of the first number of fuel injector ports being fluidly connected to a corresponding one of the first number of intake runner passages. The second intake manifold has the second number of fuel injector ports, each of the second number of fuel injector ports being fluidly connected to a corresponding one of the first number of intake runner passages. One of the first and second intake molds further includes a fuel injector port insert for forming at least one of the first number of fuel injector ports of the first intake manifold. Manufacturing the first intake mold further includes inserting the fuel injector port insert into the corresponding one of the first and second intake molds before forming the corresponding one of the first and second portions of the first intake manifold using the corresponding one of the first and second intake molds.

In some implementations, the fuel injector port insert is a first fuel injector port insert configured for defining at least one of the first number of fuel injector ports of the first intake manifold and one of the first and second intake molds further comprises a second fuel injector port insert configured for defining at least one of the second number of fuel injector ports of the second intake manifold, the second fuel injector port insert being different from the first fuel injector port insert. Manufacturing the second intake mold further includes inserting the second fuel injector port insert into the corresponding one of the first and second intake molds before forming the corresponding one of the first and second portions of the second intake manifold using the corresponding one of the first and second intake molds.

In some implementations, the second intake manifold further includes at least one closed fuel injector port corresponding to one of the first number of intake runner passages and the second fuel injector port insert includes a closed fuel injector port insert for defining the at least one closed fuel injector port.

In some implementations, one of the first and second intake molds further includes an intake runner slider for defining at least a portion of the first number of intake runner passages. Manufacturing the first intake manifold further includes moving the intake runner slider in a direction transverse to a direction of opening of the corresponding one of first and second intake molds before forming the corresponding one of the first and second portions of the first intake manifold using the corresponding one of first and second intake molds. Manufacturing the second intake manifold further includes, moving the intake runner slider in the direction transverse to the direction of opening of the corresponding one of first and second intake molds before forming the corresponding one of the first and second portions of the second intake manifold using the corresponding one of first and second intake molds.

In some implementations, the intake runner slider is a rotary slider and moving the intake runner slider includes rotating the intake runner slider about an axis of rotation disposed transverse to the direction of opening of the corresponding one of the first and second intake molds.

In some implementations, the first intake manifold further includes a first pattern of holes for mounting the first intake manifold to the first engine and the second intake manifold further includes a second pattern of holes for mounting the second intake manifold to the second engine, the second pattern of holes being different from the first pattern of holes. One of the first and second intake molds further includes a flange insert for use with one of the first and second intake molds for defining at least a portion of the first pattern of holes. Manufacturing the first intake manifold includes inserting the flange insert in the corresponding one of the first and second intake molds before forming the corresponding one of the first and second portions of the first intake mold using the corresponding one of the first and second intake molds.

In some implementations, the flange insert is a first flange insert configured to define at least the portion of the first pattern of holes. One of the first and second intake molds further includes a second flange insert configured for use with one of the first and second intake molds for defining at least a portion of the second pattern of holes, the second flange insert being different from the first flange insert. Manufacturing the second intake manifold further includes inserting the second flange insert in the corresponding one of the first and second intake molds before forming the corresponding one of the first and second portions of the second intake manifolds using the corresponding one of the first and second intake molds.

In some implementations, one of the first and second intake molds has an intake manifold defining slider for use with one of the first and second intake molds for defining at least a portion of the first and second intake manifolds. Manufacturing the first intake manifold further includes moving the intake manifold defining slider in a direction transverse to a direction of opening of the corresponding one of first and second intake molds before forming the corresponding one of the first and second portions of the first intake manifold using the corresponding one of the first and second intake molds. Manufacturing the second intake manifold further includes moving the intake manifold defining slider in the direction transverse to the direction of opening of the corresponding one of first and second intake molds before forming the corresponding one of the first and second portions of the second intake manifold using the corresponding one of the first and second intake molds.

In some implementations, connecting the first portion of the first intake manifold to the second portion of the first intake manifold includes friction welding the first portion of the first intake manifold to the second portion of the first intake manifold and connecting the first portion of the second intake manifold to the second portion of the second intake manifold includes friction welding the first portion of the second intake manifold to the second portion of the second intake manifold.

In accordance with another aspect of the present technology, there is provided a system for manufacturing a family of intake manifolds including at least a first air intake manifold and a second air intake manifold for a family of engines including at least a first engine and a second engine. The first engine has a first number of cylinders. The second engine has a second number of cylinders, the second number being smaller than the first number, and the second number being at least one. The system includes a first intake mold for molding a first portion of any one of the family of intake manifolds including a first portion of a plenum chamber and a second intake mold for molding a second portion of any one of the family of intake manifolds including a second portion of the plenum chamber. One of the first and second intake molds comprises an outlet insert for use with one of the first and second intake molds for forming at least one outlet. When manufactured by the system, the first intake manifold includes the plenum chamber, a plenum chamber air inlet, the first number of intake runner passages, and the first number of outlets. Each of the outlets is fluidly connected to a corresponding one of the first number of intake runner passages and configured for fluid connection to a corresponding one of the first number of cylinders. The second intake manifold includes the plenum chamber, the plenum chamber air inlet, the first number of intake runner passages, and the second number of outlets. Each of the second number of outlets is fluidly connected to a corresponding one of the first number of intake runner passages and configured for fluid connection to a corresponding one of the second number of cylinders. At least one of the first number of intake runner passages of the second intake manifold is not fluidly connected to any one of the second number of outlets of the second intake manifold.

In some implementations, one of the first and second intake molds further includes a fuel injector port insert for forming at least one fuel injector port. When manufactured by the system, the first intake manifold includes the first number of fuel injector ports, each of the fuel injector ports being fluidly connected to a corresponding one of the first number of intake runner passages and the second intake manifold includes at least the second number of fuel injector ports, each of the fuel injector ports being fluidly connected to a corresponding one of the first number of intake runner passages, at least one of the first intake manifold and the second intake manifold having been formed by using the fuel injector port insert.

In some implementations, the fuel injector port insert is integrated with the outlet insert.

In some implementations, one of the first and second intake molds further comprises a flange insert for forming at least one mounting hole in a mounting flange. When manufactured by the system, the first intake manifold has a first mounting flange having a first pattern of mounting holes and the second intake manifold has a second mounting flange having a second pattern of mounting holes, the second pattern of holes being different from the first pattern of holes. The first mounting flange is configured for mounting the first intake manifold to the first engine having the first number of cylinders and the second mounting flange is configured for mounting the second intake manifold to the second engine having the second number of cylinders. At least one of the first and second mounting flanges having been formed using the flange insert In some implementations, the flange insert is integrated with the outlet insert.

In some implementations, one of the first and second intake molds further includes a slider for forming at least one portion of the first intake manifold and the second intake manifold. When manufactured by the system, the first intake manifold has the at least one portion and the second intake manifold has the at least one portion.

In accordance with another aspect of the present technology, there is provided an intake manifold of a family of intake manifolds for a family of engines including at least a first engine and a second engine. The first engine includes a first number of cylinders. The second engine includes a second number of cylinders, the second number being smaller than the first number, the second number being at least one. The intake manifold is configured for a selected engine of the family of engines, the selected engine having a corresponding selected number of cylinders. The intake manifold is manufactured using a first intake mold and a second intake mold. The intake manifold includes a plenum chamber, a plenum chamber air inlet fluidly connected to the plenum chamber, the first number of intake runner passages fluidly connected to the plenum chamber, and at least the selected number of outlets. Each of the selected number of outlets is fluidly connected to a corresponding one of the first number of intake runner passages and configured for connection to a corresponding one of the selected number of cylinders of the selected engine for directing air from the plenum chamber via the corresponding intake runner passage into the corresponding one of the selected number of cylinders. At least one of the first number of intake runner passages is not fluidly connected to any one of the selected number of outlets when the selected number is less than the first number. A mounting flange is configured for mounting the intake manifold to the selected engine.

In some implementations, the intake manifold has the selected number of fuel injector ports, each of the selected number of fuel injector port being fluidly connected to a corresponding one of the first number of intake runner passages and a corresponding one of the selected number of outlets for directing fuel into the corresponding one of the selected number of cylinders.

In some implementations, the entirety of each of the first number of intake runner passages is one of enclosed by and adjacent to the plenum chamber.

In accordance with another aspect of the present technology, there is provided a powerpack of a family of powerpacks including at least a first powerpack and a second powerpack. The powerpack includes an engine selected from a group of engines including a first engine and a second engine. The first engine has a first number of cylinders. The second engine has a second number of cylinders, the second number being smaller than the first number, and the second number being at least one. The powerpack also includes an intake manifold selected from a group of intake manifolds including a first intake manifold configured for the first engine and a second intake manifold configured for the second engine. The first intake manifold includes a plenum chamber, a plenum chamber air inlet, the first number of intake runner passages, and the first number of outlets. Each of the first number of outlets of the first intake manifold is fluidly connected to a corresponding one of the first number of intake runner passages and configured for fluid connection to a corresponding one of the first number of cylinders. The second intake manifold includes the plenum chamber, the plenum chamber air inlet, the first number of intake runner passages, and at least the second number of outlets. Each of the second number of outlets of the second intake manifold is fluidly connected to a corresponding one of the first number of intake runner passages and configured for fluid connection to a corresponding one of the second number of cylinders of the second engine. At least one of the first number of intake runner passages of the second intake manifold is not fluidly connected to any one of the second number of outlets of the second intake manifold. The selected intake manifold is connected to the selected engine such that each of the selected number of outlets of the selected intake manifold is connected to a corresponding one of the cylinders of the selected engine.

For the purpose of this application, terms related to spatial orientation such as upper, lower, downwardly, rearward, forward, front, rear, left, right, above and below are described using a reference frame in which the crankshaft of the engine extends horizontally and longitudinally, and extends rearwards from the engine, to connect, via a transmission, to an operating element driven by the engine, for example, a wheel of a vehicle. In addition, the vertical direction is defined herein by a cylinder axis of the cylinders of the engine shown herein. In addition, for the purpose of the present application, the vertical direction is defined by a cylinder axis of a cylinder of the engine, with the crankshaft being disposed at the bottom of the cylinder. The orientation shown herein and the reference frame selected for description are purely for simplicity of description. Directional terms such as front, rear, upper and lower are relative terms and not intended to be limiting.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7A is a perspective view, taken from a rear, top and left side, of the intake manifold of FIG. 2A shown in isolation;

FIG. 11C is a perspective view, taken from a rear, bottom and left side, of a rotary slider of the first intake mold of FIGS. 11A and 11B shown in isolation;

DETAILED DESCRIPTION

The present technology is described with respect to a family of four-stroke internal combustion engines but aspects of the present technology can be applied to other types of internal combustion engines.

Figure 1A:
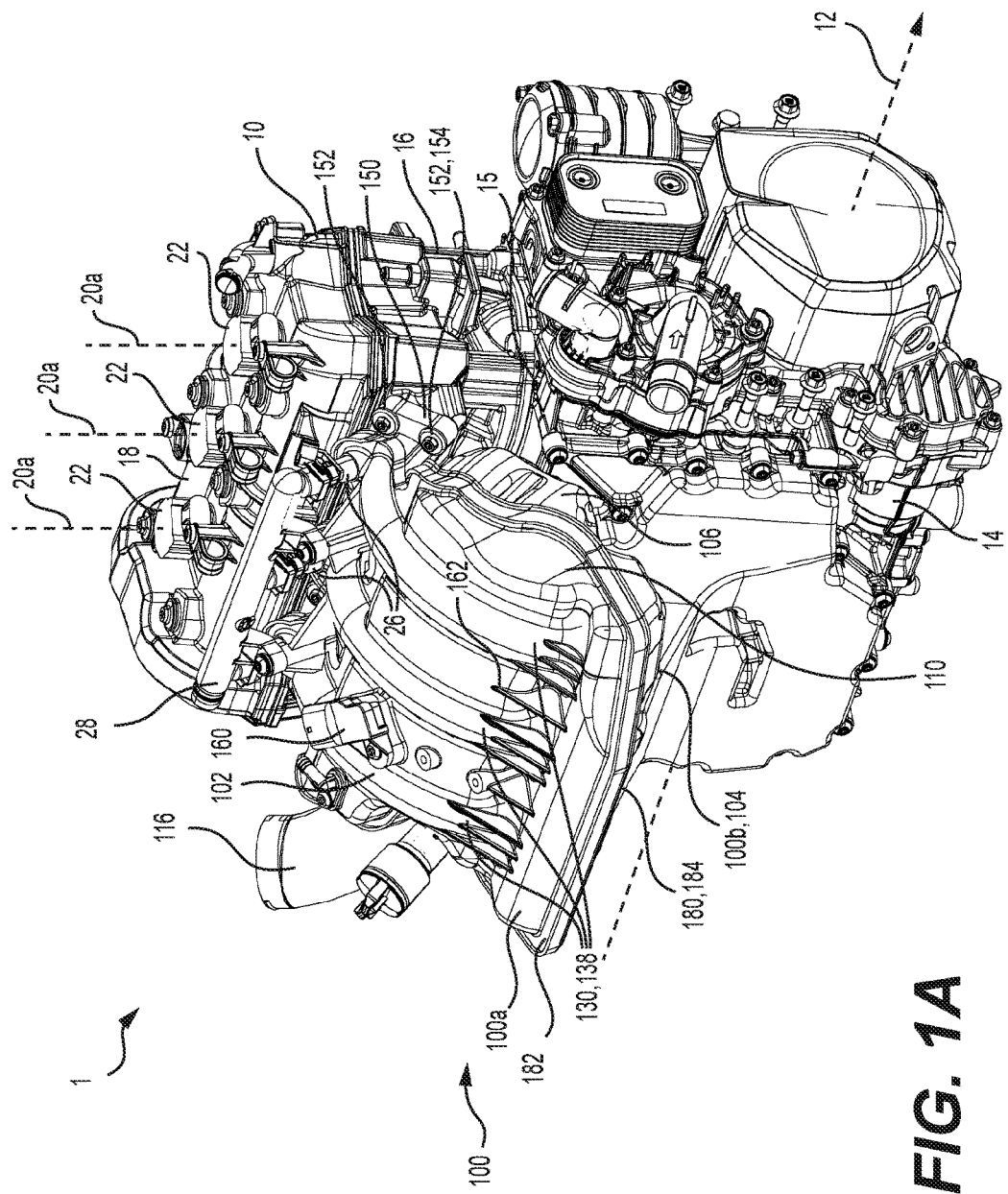
FIG. 1A is a perspective view, taken from a front, and right side, of a powerpack including a three-cylinder internal combustion engine and an intake manifold therefor in accordance with one implementation of the present technology.
Figure 1B:
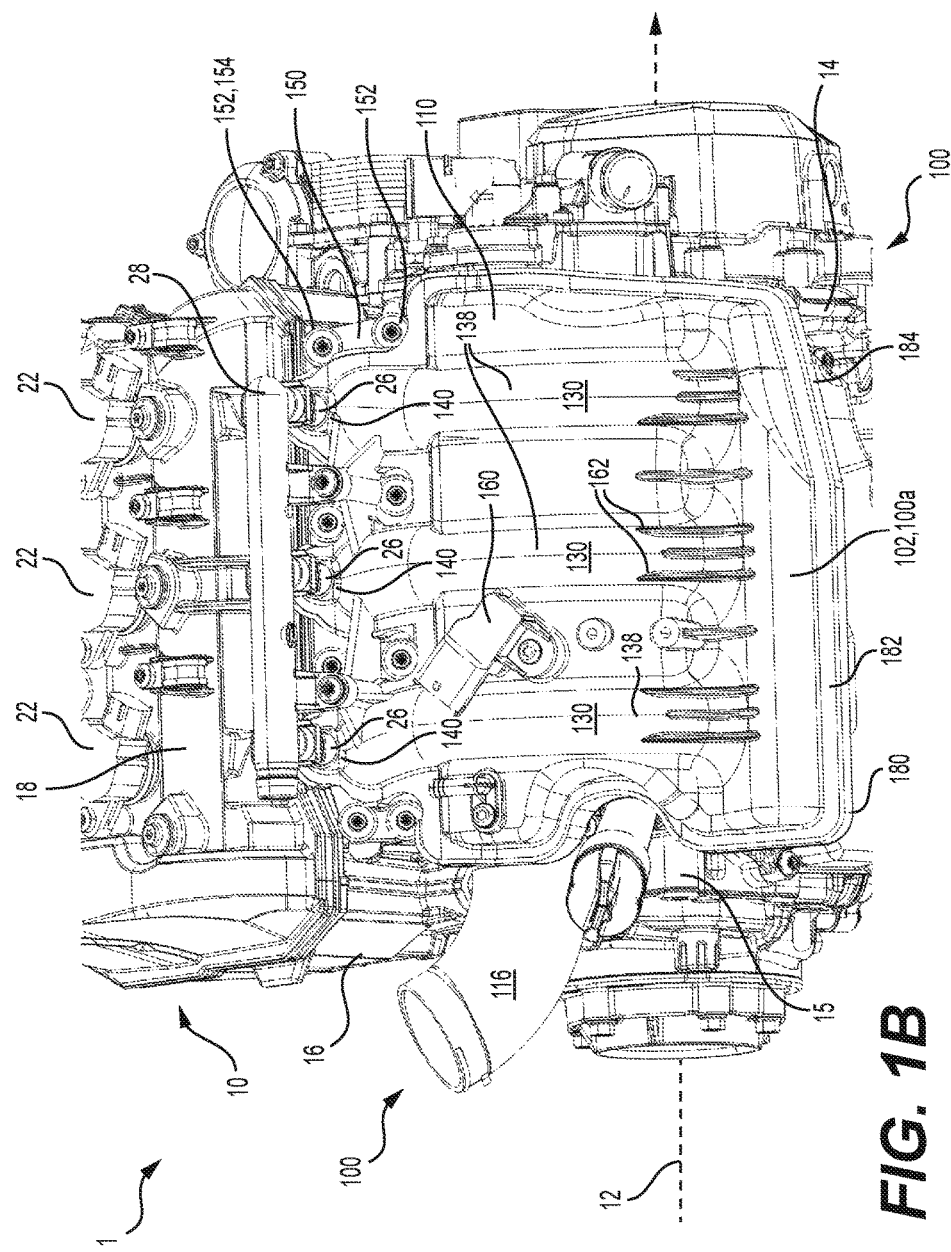
FIG. 1B is a close-up perspective view, taken from a top, and right side, of the powerpack of FIG. 1A.
Figure 1C:
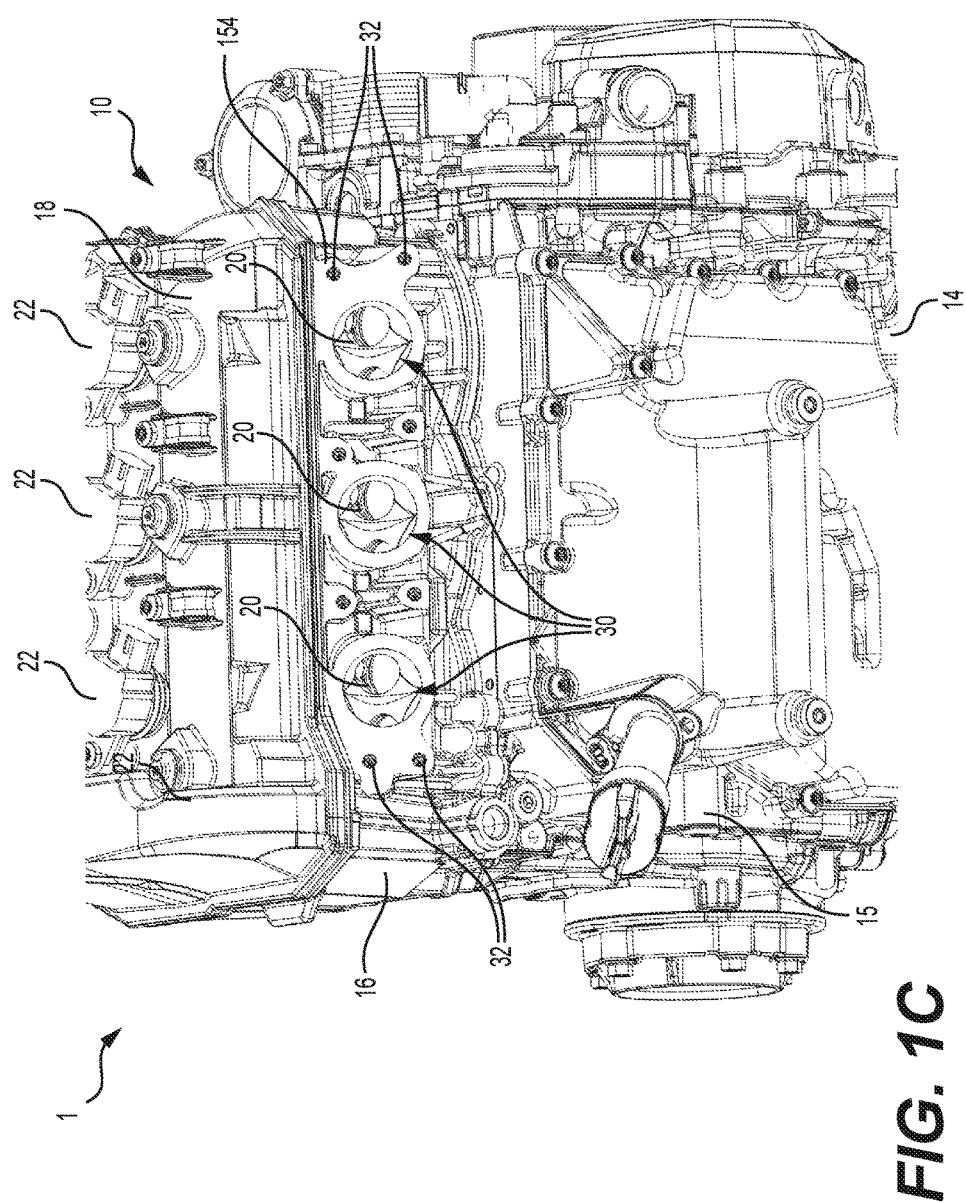
FIG. 1C a close-up perspective view, taken from a top, and right side, of the powerpack of FIG. 1B with the intake manifold being removed for clarity.

With reference to FIGS. 1A to 1C, a first member 1 of a family of powerpacks includes a first engine 10 and a first intake manifold 100. In the illustrated implementation, the first engine 10 is a inline three-cylinder fuel-injected four-stroke internal combustion engine.

It is contemplated that other types of internal combustion engines could be used. For example, the engine could be a direct injection or a two-stroke internal combustion engine.

With reference to FIG. 1A to 1C, the engine 10 has a crankshaft (not shown) which rotates about a crankshaft axis 12 (FIGS. 1A and 1B) disposed generally longitudinally and horizontally. The crankshaft extends rearwardly from the engine 10 to operatively connect, via a transmission (not shown), to a driven element, such as a vehicle wheel, which is driven by the engine 10.

The engine 10 has a crankcase 14, a cylinder block 15 disposed on and connected to the crankcase 14, a cylinder head 16 disposed on and connected to the cylinder block 15 and a valve cover 18 disposed on and connected to the cylinder head 16. The crankshaft is housed in the crankcase 14.

The cylinder block 15 defines three cylinders 20 in the cylinder block 15. Each cylinder 20 defines a cylinder axis 20a. A piston (not shown) is disposed inside each cylinder 20 for reciprocal movement therein along the cylinder axis 20a. The lower end of each piston is linked by a connecting rod (not shown) to the crankshaft. A combustion chamber is defined in the upper portion of each cylinder 20 by the upper portion of the walls of the respective cylinder 20, the cylinder head 16 and the top of the corresponding piston. In the illustrated implementation of the engine 10, each cylinder 20 has an intake passage 30 (FIG. 1C) defined in the right side wall of the cylinder head 16 for receiving air and fuel. A spark plug 22 is provided for each cylinder 20 to ignite the air/fuel mixture in each cylinder 20. Each spark plug 26 is mounted to the cylinder head 16 and can be seen protruding out of the valve cover 18. Explosions caused by the combustion of the air/fuel mixture inside the combustion chambers of the cylinder 20 cause the pistons to reciprocate inside the cylinders 20. The reciprocal movement of the pistons causes the crankshaft to rotate, thereby allowing power to be transmitted from the crankshaft to the driven element, such as a vehicle wheel (not shown).

As can be seen, the cylinders 20 are arranged in an inline configuration such that the cylinder axes 20a of the three cylinders 20 define a cylinder plane extending generally vertically and longitudinally. The rotation axis 12 of the crankshaft is contained in the cylinder plane. It is also contemplated that the engine 10 could have more than three cylinders 20 or fewer than three cylinders 20. In general, the cylinder plane is defined as a plane containing the respective cylinder axes 20a of the cylinders 20 and containing the crankshaft axis 12.

For convenience, the present description uses a reference frame in which the crankshaft of the engine extends horizontally and longitudinally, the crankshaft extends out of the engine 10 in a rearwardly direction, and the cylinder axes 20a extend vertically with the crankshaft being disposed below the cylinders. It should be understood, that in general, the engine 10 and powerpack 1 can be mounted in different orientations. The orientation shown herein and the reference frame selected for description are purely for simplicity of description. Directional terms such as front, rear, upper and lower are relative terms and therefore intended to be interpreted accordingly.

The engine 10 receives air from an air intake system (not indicated) including an air intake manifold 100 which will be described in further detail below. The powerpack 1 includes three fuel injectors 26 mounted to the intake manifold 100. Each fuel injector 26 delivers air to a corresponding one of the three cylinders 20 via a corresponding runner 130 of the air intake manifold 100. The fuel injectors 26 receive fuel from a fuel tank (not shown) via a fuel rail 28. It is contemplated that the fuel injectors 26 could be mounted to the cylinder head 16 and/or the valve cover 18 instead of the intake manifold 100 for directing fuel to the cylinders 20 directly instead of through the runners 130.

The exhaust gases resulting from the combustion of the air-fuel mixture in the combustion chamber are removed from the engine 10 via an exhaust system (not shown) and then released to the atmosphere.

The powerpack 1 includes other systems and components, such as a magneto, starter motor, a lubrication system, a water cooling system and the like, connected to the engine 10 which aid in the functioning of the engine 10. As these systems and components are known they will not be described herein.

With reference to FIGS. 3A to 6C, the intake manifold 100 is generally a bulbous hollow structure defined by an upper wall 102, a lower wall 104, a front wall 106 and a rear wall 108. The intake manifold 100 includes a plenum chamber 110, an air inlet 112 (FIG. 5A) and three outlets 114. The plenum chamber 110 is defined by the walls 102, 104, 106, 108. The air inlet 112 is defined in the rear wall 108 and the three outlets 114 are defined by the lower wall 104.

The intake manifold 100 also includes an air intake conduit 116 connected to the rear wall 108 around the air inlet 112 for delivering air to the plenum chamber 110. The air intake conduit 116 extends rearward, then leftwardly and upwardly from the rear wall 108 to connect to a throttle body (not shown) of the air intake system. The throttle body includes a throttle valve which regulates air flow into the engine 10. The plenum chamber 110 provides a large volume for equilibrating air pressure before air enters the cylinders 20 for combustion therein.

Enclosed within the walls 102, 104, 10, 108 are three runners 130. The runners 130 are generally identical to one another. As such only the front runner 130 will be described herein for simplicity. The runner 130 is defined by a runner wall 138. The upper wall 102 forms an upper portion of the runner wall 138. The runner 130 comprises a passage 132 extending from a corresponding outlet 114 to a runner inlet 134. The runner inlet 134 is open to the interior volume of the airbox 110. The passage 132 extends along the upper wall 102 and is partly defined by the upper wall 102. The runner outlet 114 which is also the intake manifold outlet 114 is connected to the intake passage 30 of the front cylinder 20. The runner 130 is curved such that a central axis 136 of the runner passage 132 is curved. The passage 132 is generally circular in cross section. As can be seen best in FIGS. 4B, 5A, and 6A to 6C, the runner passage 132 has a generally uniform diameter along its length except near the inlet 134 where the diameter of the passage 132 increases to form a flared runner inlet 134. The runner 130 directs air from the airbox 110 to the front cylinder 20. It is contemplated that the runner 130 could be configured differently than as shown herein. For example, a portion of the runner 130, or the entirety thereof could be linear instead of being curved.

With reference to FIGS. 3A, 4A, 4B, and 6A to 6C, three fuel injector ports 140 are defined in the upper wall 102. The fuel injector ports 140 are generally identical to one another, and as such, only the front fuel injector port 140 will be described herein. In the illustrated implementation, the fuel injector port 140 is linear with a linear central axis 142. The fuel injector port 140 connects to a corresponding runner passage 132 near the outlet 114 thereof. The central axis 142 of the fuel injector port 140 passes through the runner outlet 114 without intersecting the runner wall 138. The central axis 142 of the fuel injector port 140 intersects the central axis 136 of the runner passage 132 beyond the runner outlet 114 at an acute angle. The fuel injector port 140 is thereby fluidly connected, via the corresponding runner 130, to a corresponding cylinder 20 for delivering fuel thereto. The fuel injector port 140 is generally T-shaped with the diameter being larger in the outer portion extending from the outer surface of the upper wall 102 than in the inner portion extending to the runner passage 132. A fuel injector 26 is received in each fuel injector port 140 as can be seen best in FIG. 1B. It is contemplated that the fuel injector ports 140 could be configured differently than as shown here. For example, the diameter of each fuel injector port 140 could be uniform along its entire length.

It is also contemplated that the fuel injector ports 140 could be omitted from the intake manifold 100. For example, the fuel injector ports 140 could be defined in the cylinder head 16 or the cylinder block 15 for delivering fuel directly to the cylinder 20 instead of via the runner 130 as in the illustrated implementation where the fuel injector ports 140 are defined in the intake manifold 100.

The intake manifold 100 also includes a mounting flange 150 having several mounting holes 152. The holes are formed in a mounting hole pattern 154 to mate with a corresponding pattern 154 of mounting holes 132 formed in the cylinder head 16 (FIG. 1C). The mounting flange 150 is formed along the left edge of the intake manifold 100 where the fuel injector ports 140 and the outlets 114 are located. The mounting hole pattern 154 includes eight mounting holes 152 arranged such that each outlet 114 has two mounting holes 152 on either side thereof. Each mounting hole 152 is circumscribed by a boss for reinforcement. The mounting hole pattern 154 including the number, size, location of the mounting holes have been selected to reduce the stresses on the connection between the runner outlet 114 and the intake passage 30 of the cylinder head 16. It is however contemplated that the mounting hole pattern 154 could be different than that shown herein. For example, the number and/or location of the mounting holes 152 could be different than that shown herein.

The intake manifold 100 has a mounting bracket 164 formed on the outer surface of the upper wall 102 which is used to secure other components (not shown) of the powerpack 1 to the intake manifold 100. A number of ribs 160 and indentations 162 are formed along the outer surfaces of the walls 102, 104, 106, 108 of the intake manifold 100 to provide additional reinforcement. The inner surfaces of the walls 102, 104, 106, 108 are generally smooth to reduce impedances to airflow therethrough.

A weld line 180 is formed around the intake manifold 100. The weld line 180 is also a boundary between a first portion 100a and a second portion 100b of the intake manifold 100. As will be described below in further detail, the intake manifold 100 is made from two separate injection molded portions 100a, 100b which are then friction welded together to produce the hollow structure of the intake manifold 100 seen in FIGS. 3A and 3B.

The intake manifold 100 is made of plastic. It is contemplated that the intake manifold could be made of any suitable material.

With reference to FIGS. 2A to 2C, and 7A to 10C, a second member 1' of the family of powerpacks including a second engine 10' having connected thereto a second intake manifold 100' will now be described.

The power pack 1', engine 10' and intake manifold 100' have many features that are identical to the corresponding features of the power pack 1, engine 10 and intake manifold 100 respectively. Identical and corresponding features of the powerpacks, 1 and 1', engines, 10 and 10', and intake manifolds, 100 and 100', have been labeled with the same reference numbers, and will not be described again herein in detail. Features of the powerpack 1', engine 10', and intake manifolds 100' that are not identical to the corresponding features of the powerpack 1, engine 10, and intake manifolds 100 have been labeled with the same reference number followed by an apostrophe. The powerpack 1', engine 10' and intake manifold 100' will only be discussed in detail with regard to the differences from the powerpack 1, engine 10 and intake manifold 100 respectively.

In the illustrated implementation, the engine 10' is an inline two-cylinder fuel-injected four-stroke internal combustion engine. The engine 10' has a crankcase 14', a cylinder block 15' disposed on and connected to the crankcase 14', a cylinder head 16' disposed on and connected to the cylinder block 15' and a valve cover 18' disposed on and connected to the cylinder head 16'. The cylinder block 15' and cylinder head 16' define two cylinders 20 instead of three cylinders 20 as in the engine 10. The cylinder head 16' defines a pattern 154' of mounting holes 32 by which the intake manifold 100' is mounted to the engine 10' as will be described below. The powerpack 1' includes two fuel injectors 26 and two spark plugs 22 corresponding to the two cylinders 20.

With reference to FIGS. 2A to 2C and 7A to 10C, the intake manifold 100' will now be described.

The intake manifold 100' has two runners 130 which are identical to the runners 130 of the intake manifold 100 described above. Each or the two runners 130 is connected to one of the two cylinders 20 via an outlet 114 similar to the outlet 114 of the intake manifold 100. The intake manifold 100' has a third runner 130' which has an inlet 134 and a runner passage 132 extending therefrom similar to the runners 130. In the runner 130' however, the end of the runner passage 132 opposite to the inlet 134 is closed. Although there is no physical outlet at the end of the runner 130', the closed end of the runner 130' is referred to herein as a closed outlet 114', or outlet 114' for convenience and for simplicity of description. For ease of comparison between the intake manifolds 100 and 100', the open ends of the runners 130 are referred to herein as open outlets 114 or outlets 114, and the closed end of the runner 130' is referred to herein as a closed outlet 114', or outlet 114'.

In the illustrated implementation, the runner 130' and the closed outlet 114' of the intake manifold 100' correspond to the runner 130 and the outlet 114 of the intake manifold 100 that is disposed farthest from the inlet 112 (i.e. the front outlet 114 of the intake manifold 100). It is however contemplated that the runner 130' and the closed outlet 114' could instead correspond to the middle runner 130 and middle outlet 114, or rear runner 130 and rear outlet 114 of the intake manifold 100.

As can be seen best in FIGS. 7B to 10C, the intake manifold 100' has two instead of three fuel injector ports 140 configured to receive a fuel injector 26 therethrough. The two fuel injector ports 140 of the intake manifold 100' are identical to the fuel injector ports 140 of the intake manifold 100. One of the three fuel injector ports 140 of the intake manifold 100 is closed or unopened in the intake manifold 100' and referred to herein as closed fuel injector port 140' for convenience and ease of comparison between the intake manifolds 100 and 100'. The closed fuel injector port 140' of the intake manifold 100' is thus not configured to receive a fuel injector 26, and is not fluidly connected to the runner 130'.

As can be seen in FIGS. 7B, 9A, 9B and 10C, the fuel injector port 140' is closed or blocked from the runner passage 132 by walls 172, 178. It is contemplated that the fuel injector port 140' could be blocked from the runner passage 132 by only one of the walls 172, 178. The runner passage 132 of the runner 130' is closed or blocked from the outlet 114' by walls 172, 173, 176 and 174. In the illustrated implementation, the wall 174 is connected to the wall 172, and integrally formed therewith but it is contemplated that the walls 172, 174 could not be connected to each other. It is also contemplated that the walls 172, 174 could be configured differently than as shown herein. For example, the wall 174 could extend across the entirety of the outlet 114 instead of a portion thereof, and the wall 173 could extend continuously with the runner wall 138 without being connected to the wall 174 by the walls 173, 176.

With reference to FIGS. 7A, 7B, 9A and 9B, the intake manifold 100' has a mounting flange 150' having six mounting holes 152 which are through-holes. The shape of the mounting flange 150' is different from the shape of the mounting flange 150 while the shape and size of the mounting holes 152 is identical in both mounting flanges 150, 150'. However, the location of the six mounting holes 152 are different in the mounting flange 150 than in the mounting flange 150'.

Figure 2A:
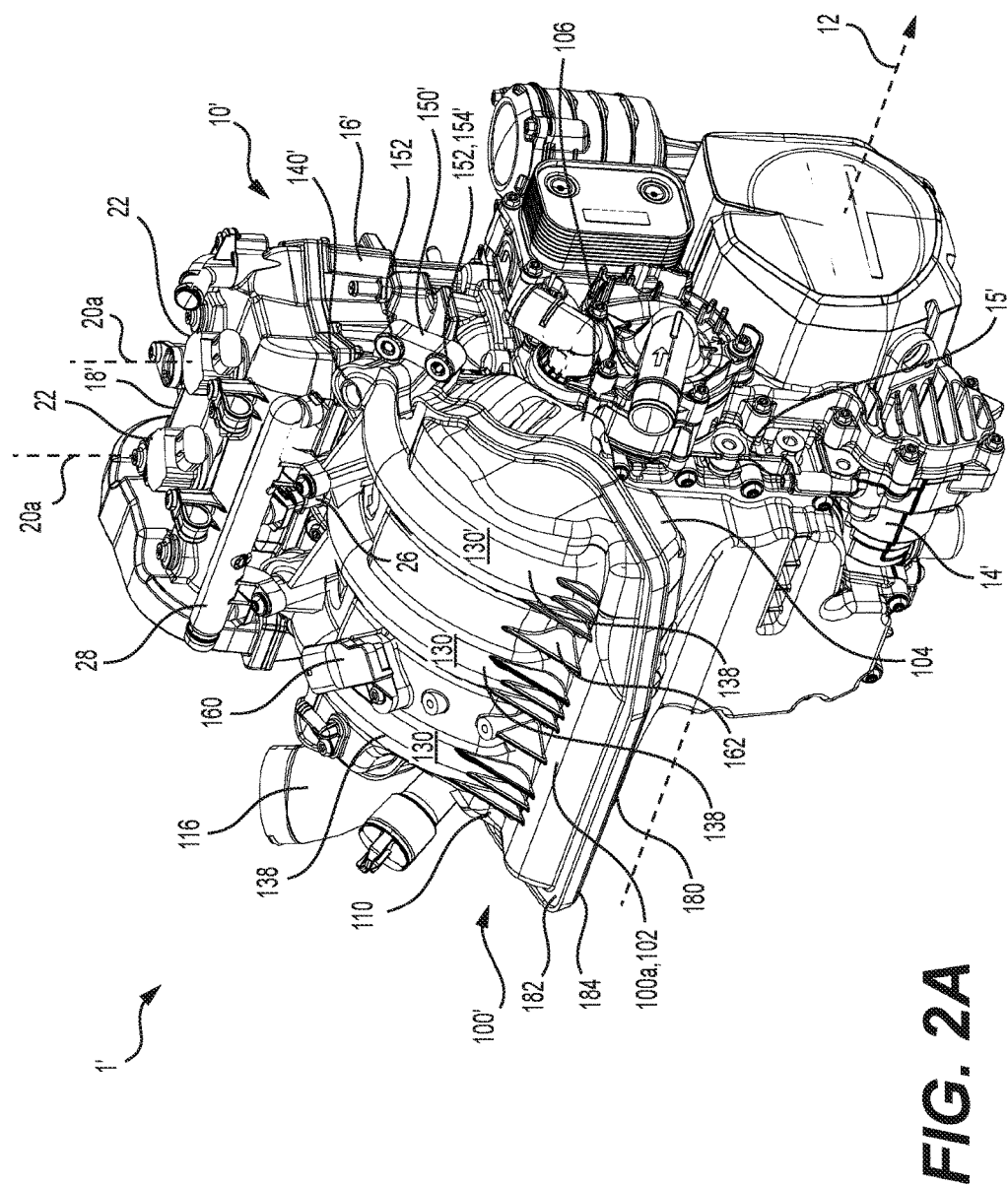
FIG. 2A is a perspective view, taken from a front, and right side, of a powerpack including a two-cylinder internal combustion engine and an intake manifold therefor in accordance with one implementation of the present technology.
Figure 2B:
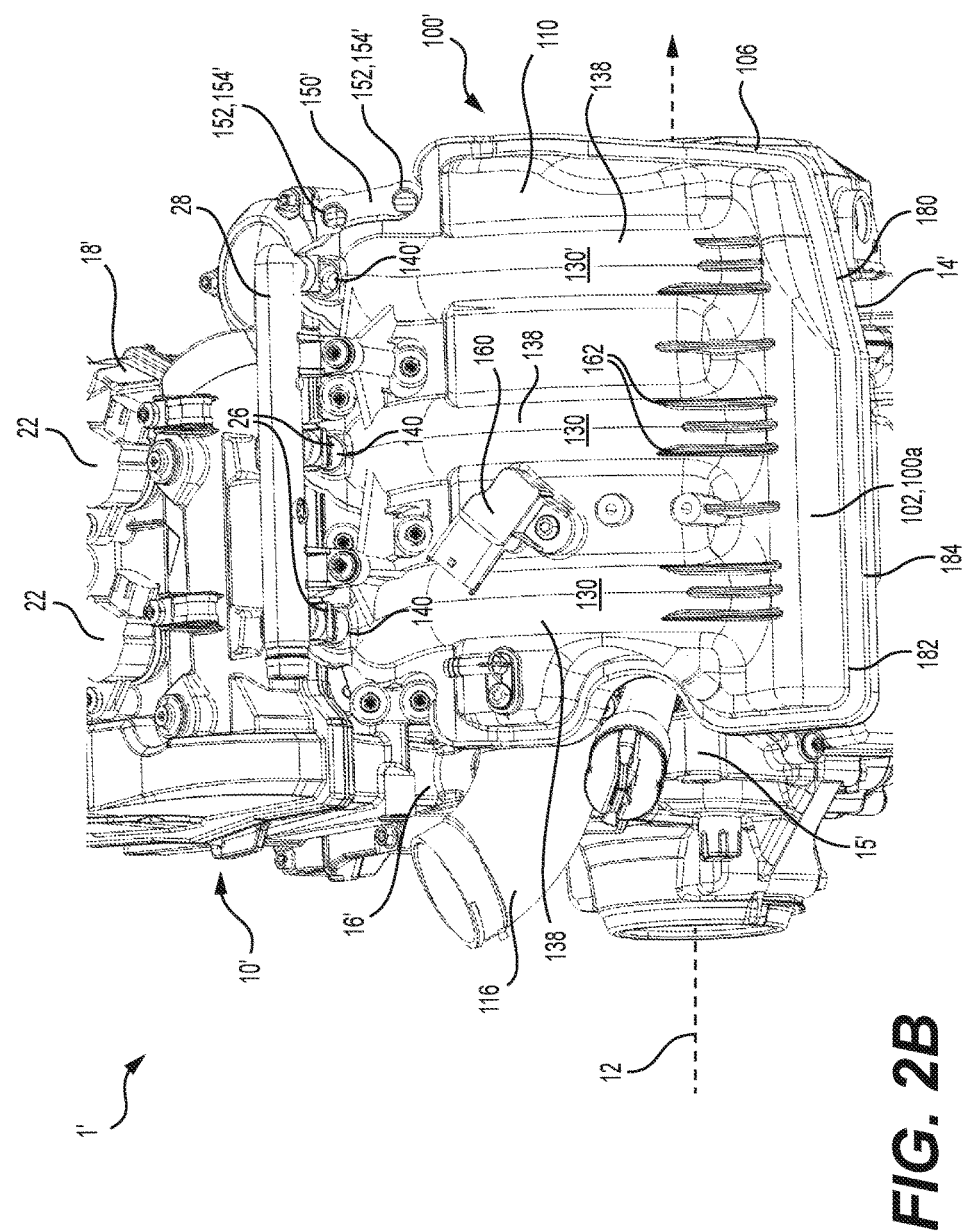
FIG. 2B is a close-up perspective view, taken from a top, and right side, of the powerpack of FIG. 2A.
Figure 2C:
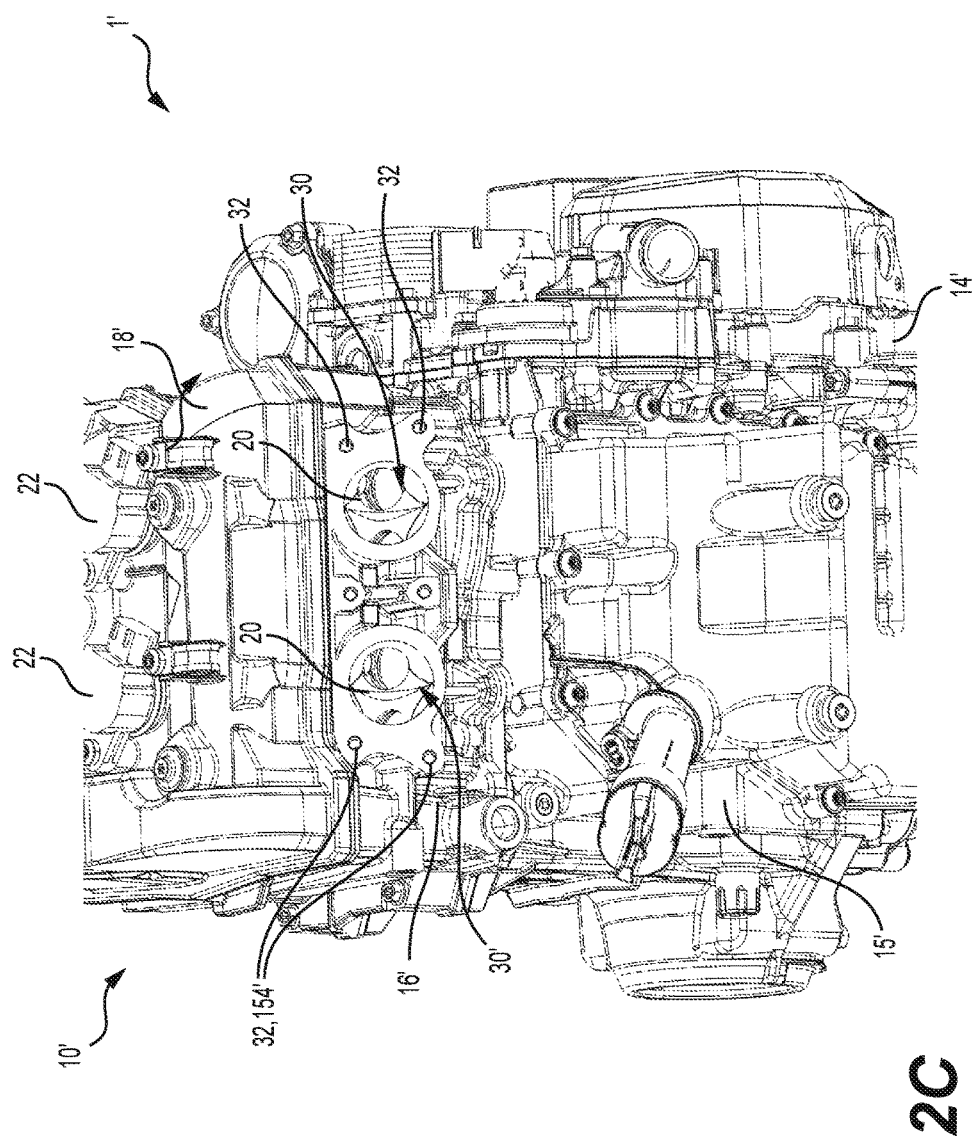
FIG. 2C a close-up perspective view, taken from a top, and right side, of the powerpack of FIG. 2B with the intake manifold being removed for clarity.
Figure 3A:
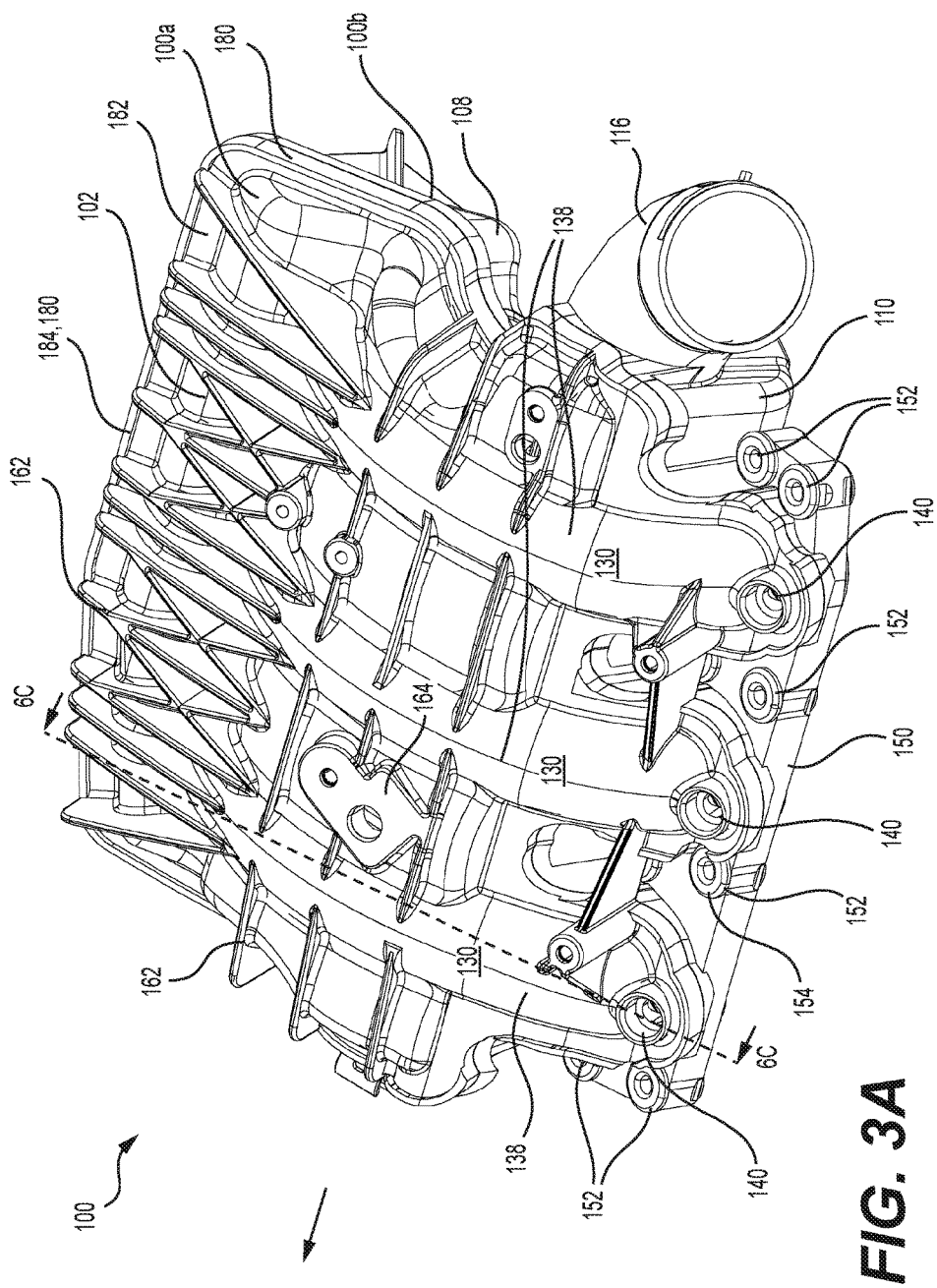
FIG. 3A is a perspective view, taken from a rear, top and left side, of the intake manifold of FIG. 1A shown in isolation.
Figure 3B:
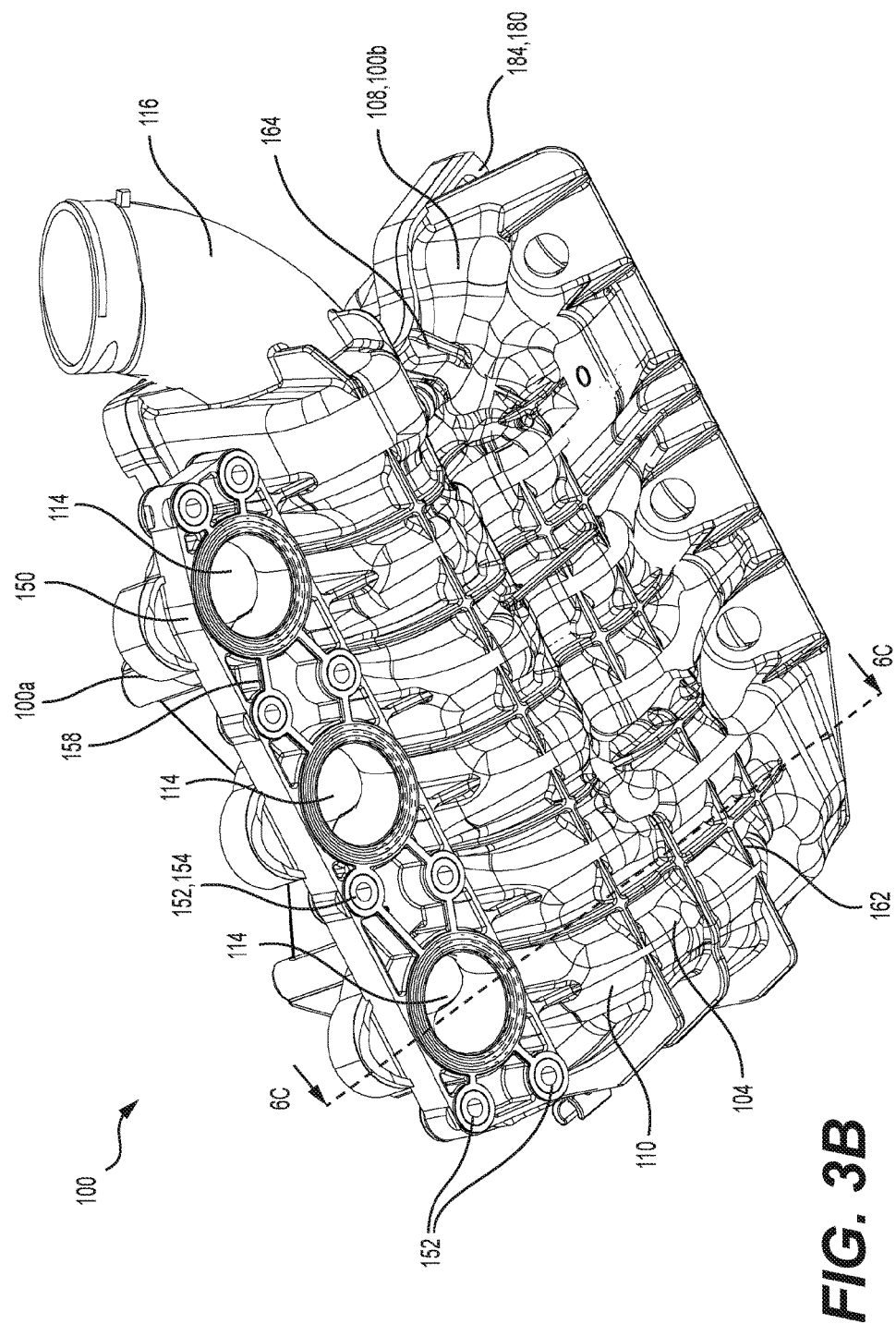
FIG. 3B is a perspective view, taken from a rear, bottom and left side, of the intake manifold of FIG. 3A.
Figure 4A:
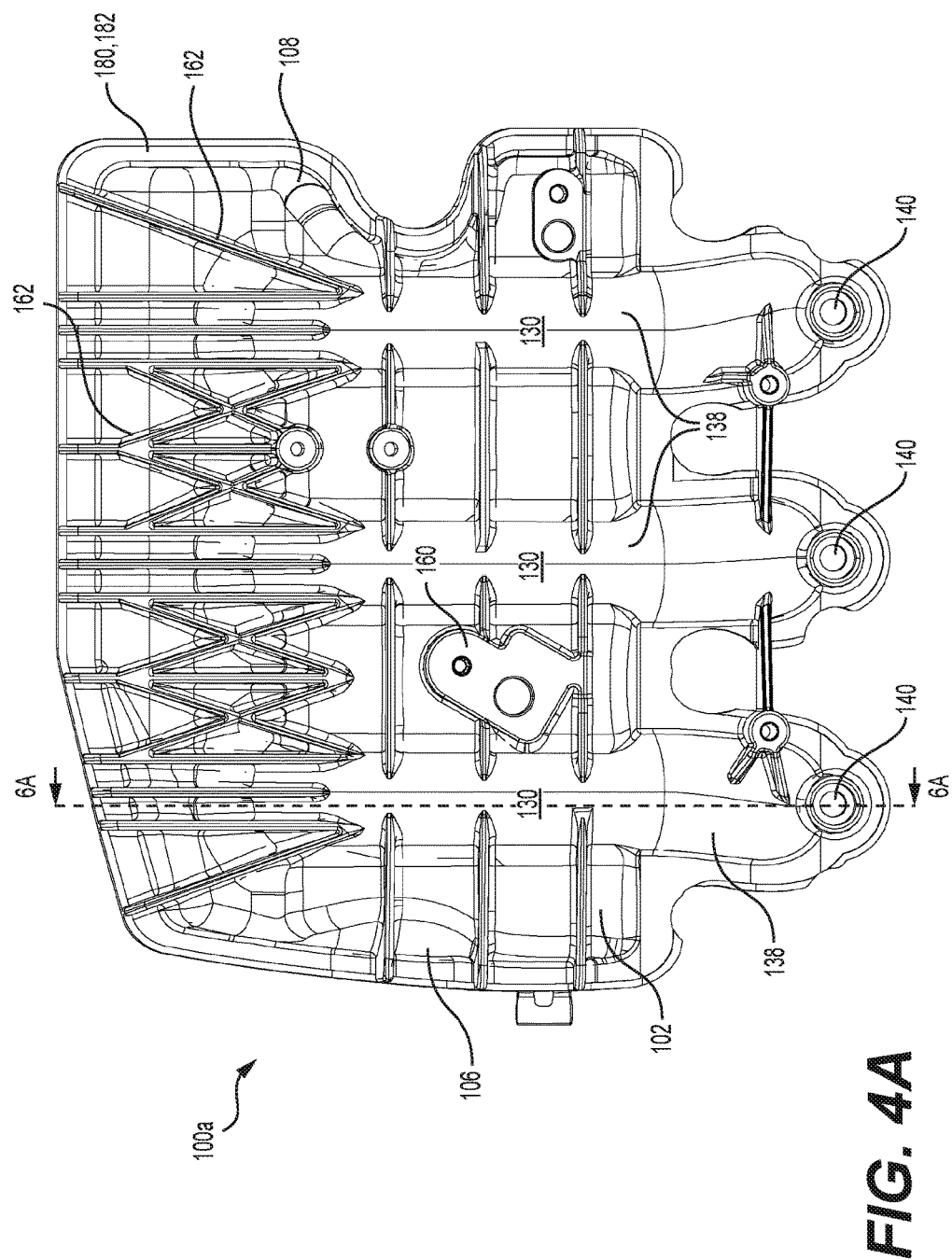
FIG. 4A is a top plan view of a first portion of the intake manifold of FIG. 3A.
Figure 4B:
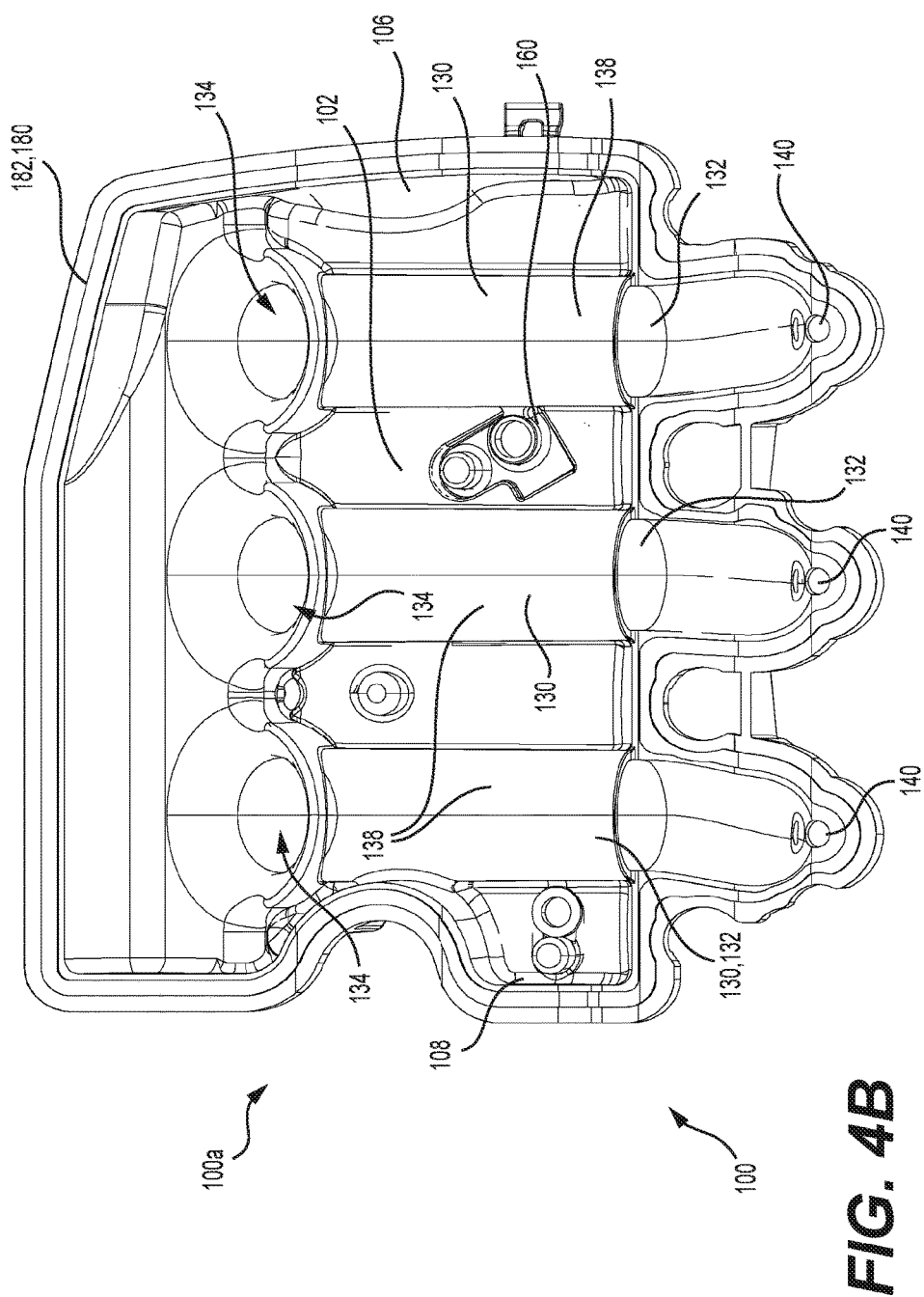
FIG. 4B is a bottom plan view of the first portion of the intake manifold of FIG. 4A.
Figure 5A:
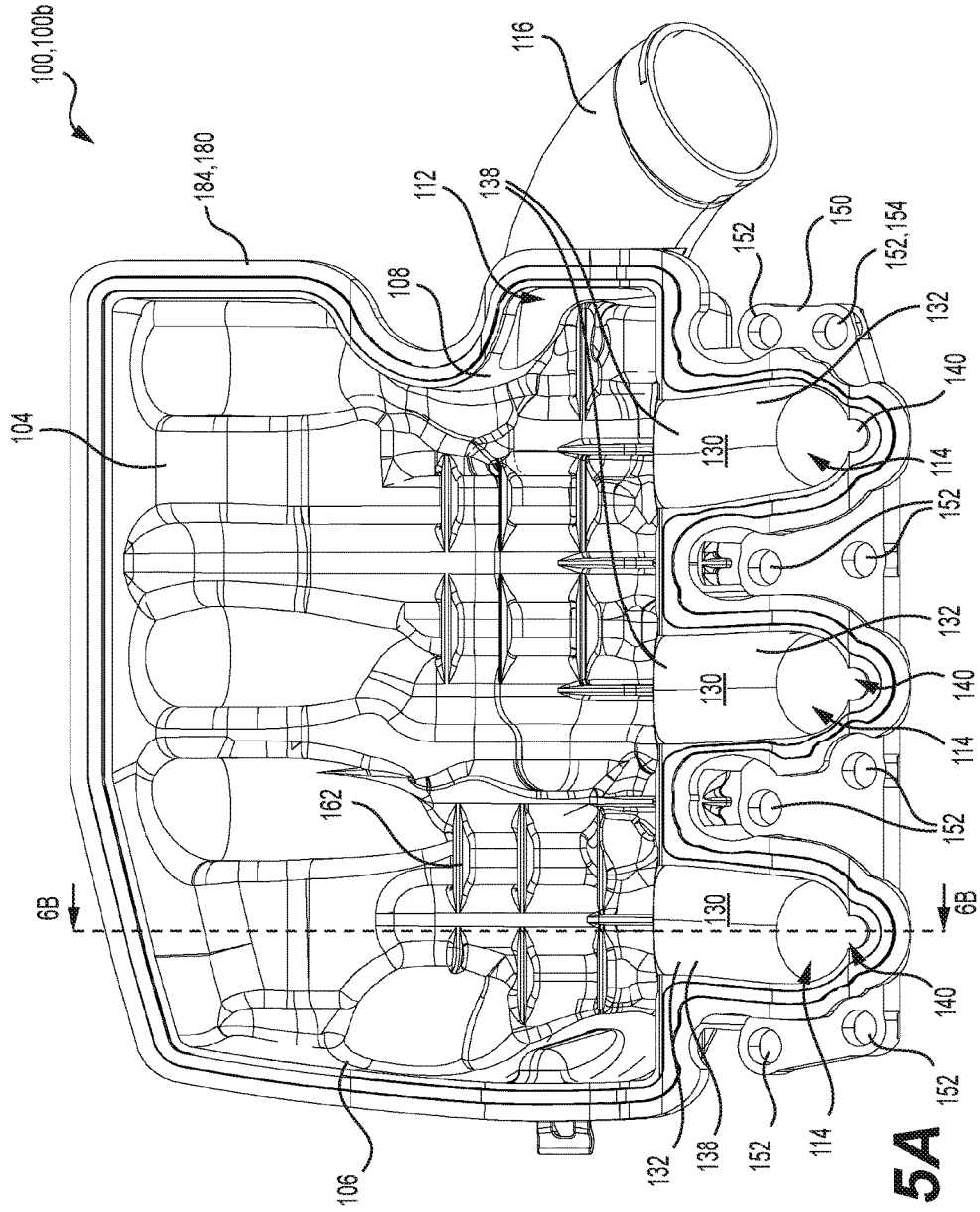
FIG. 5A is a top plan view of a second portion of the intake manifold of FIG. 3A.
Figure 5B:
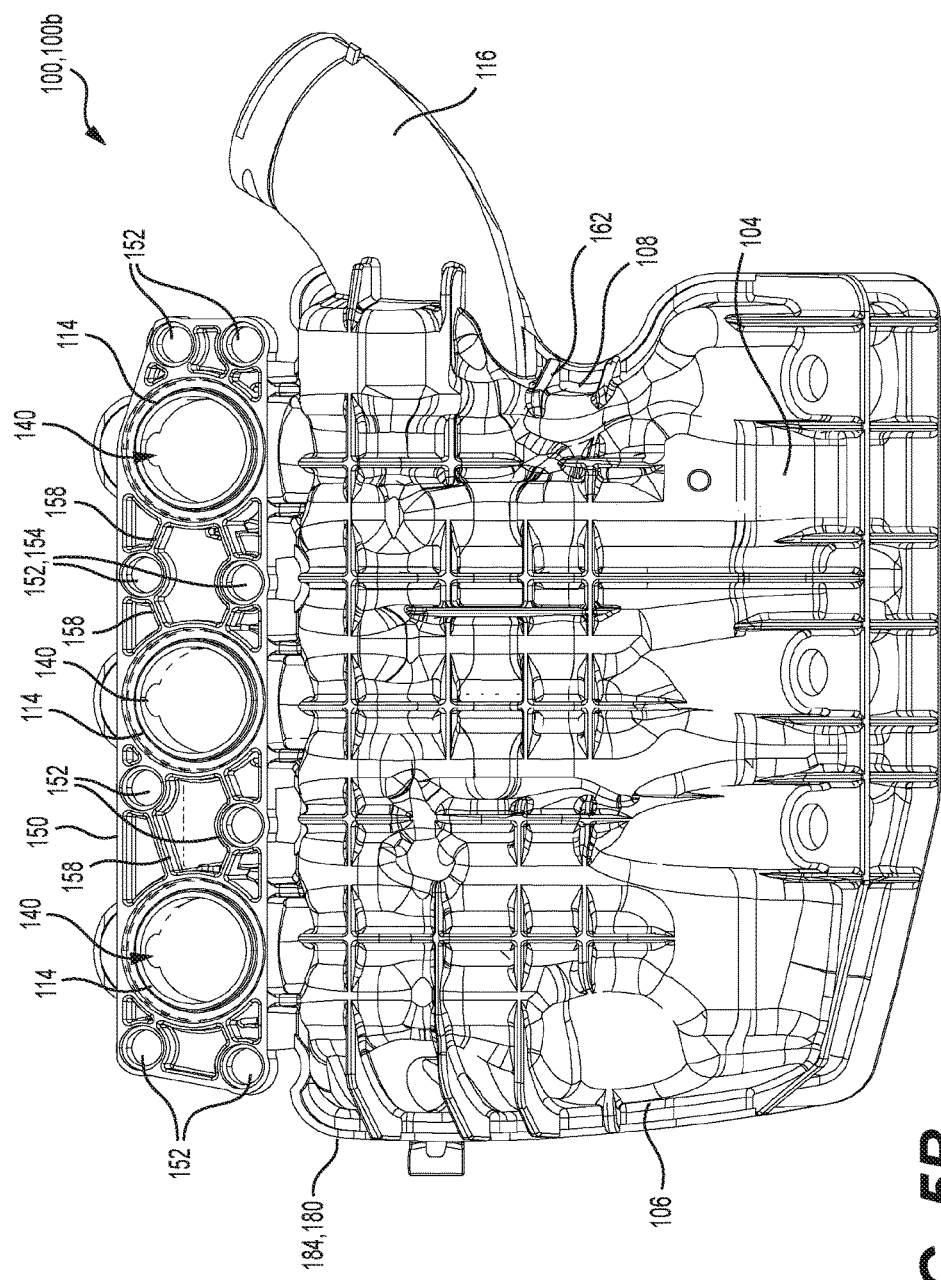
FIG. 5B is a bottom plan view of the second portion of the intake manifold of FIG. 5A.
Figure 6A:
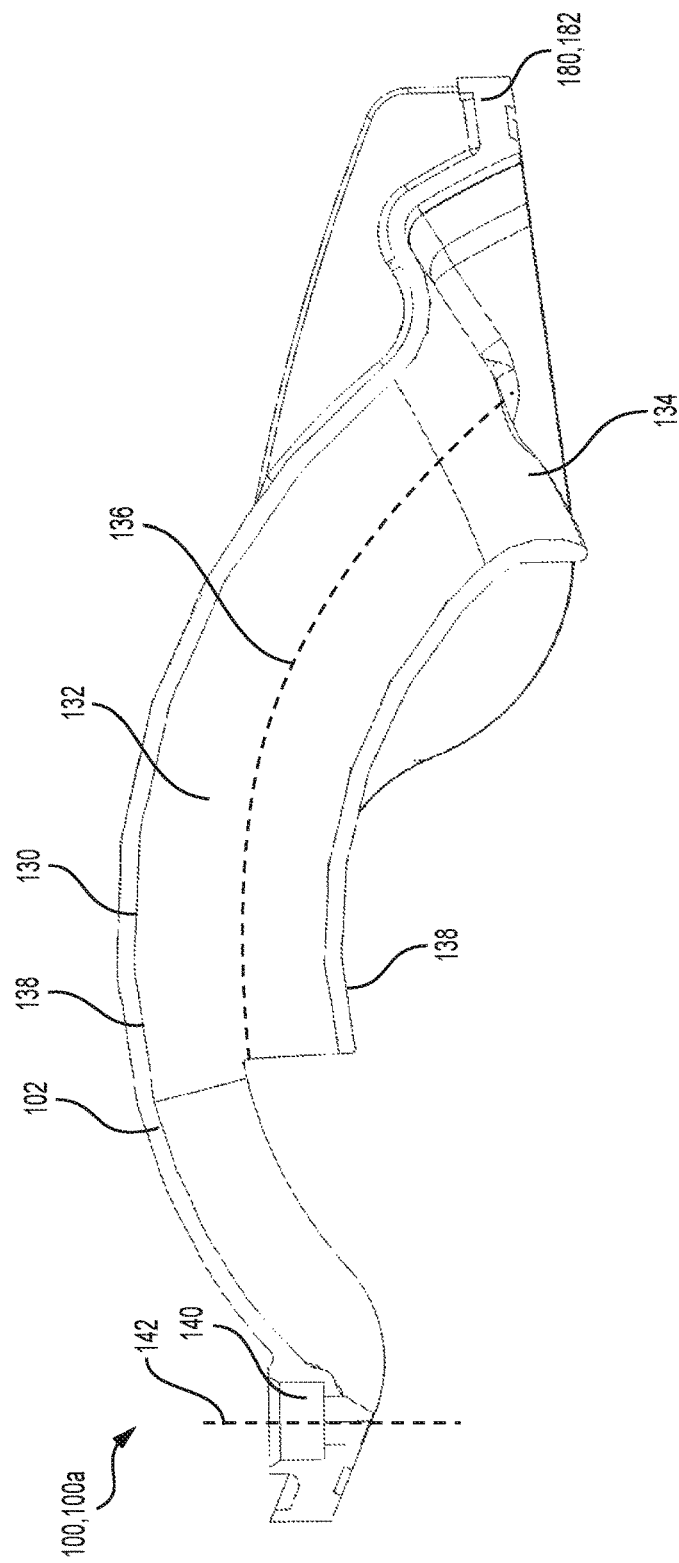
FIG. 6A is a cross-sectional view taken along the line 6A-6A of FIG. 4A.
Figure 6B:
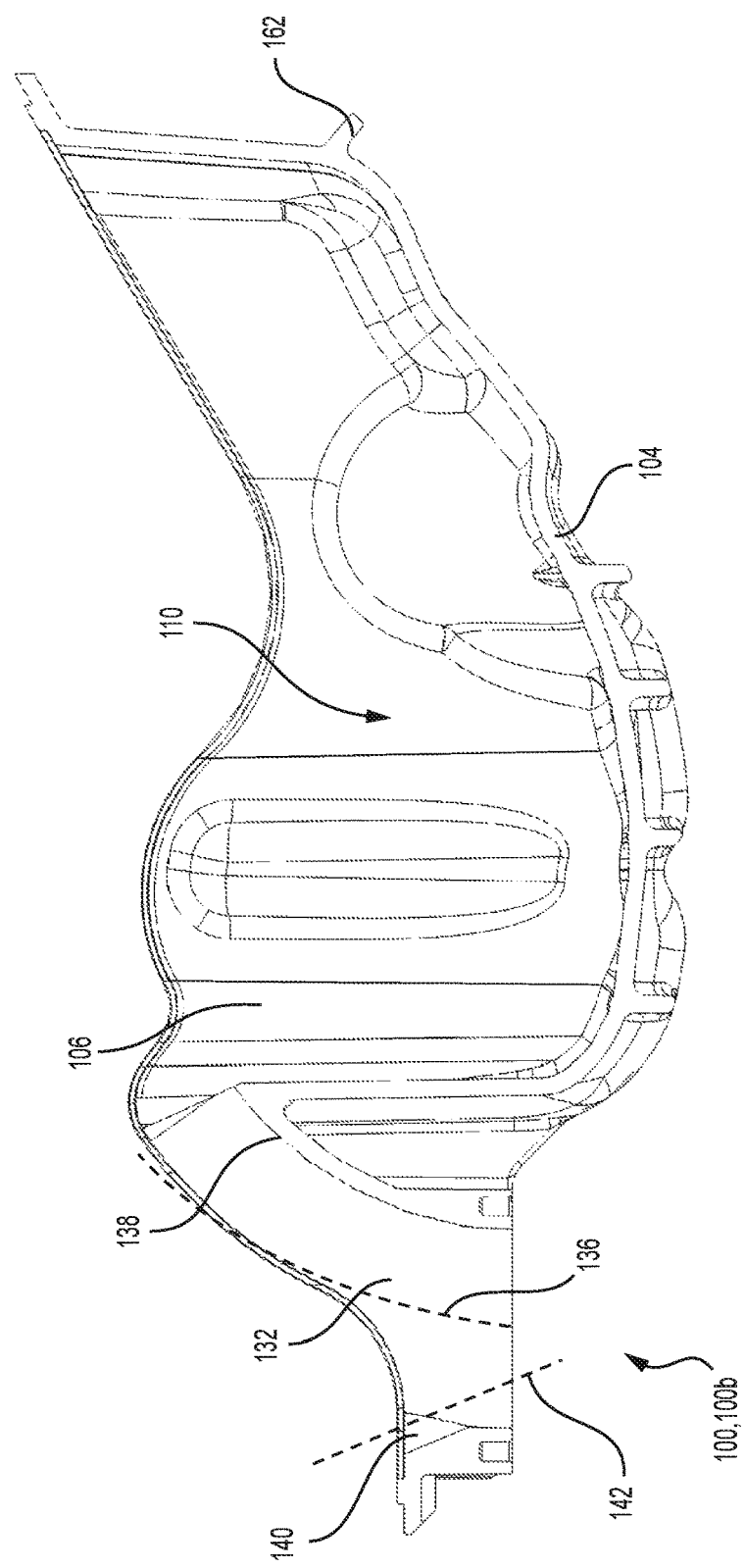
FIG. 6B is a cross-sectional view taken along the line 6B-6B of FIG. 5A.
Figure 6C:
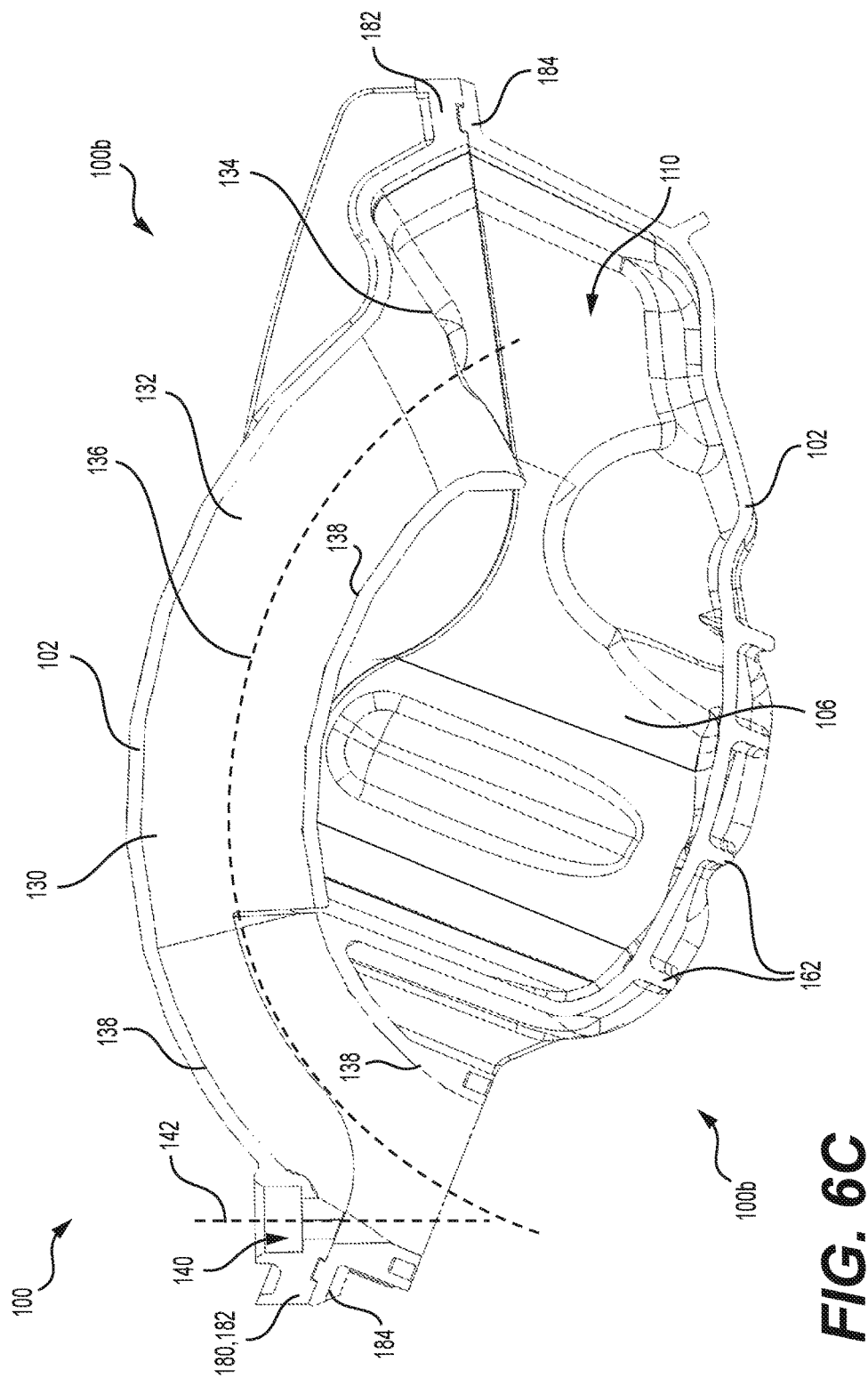
FIG. 6C is a cross-sectional view taken along the line 6C-6C of FIG. 3A.
Figure 7B:
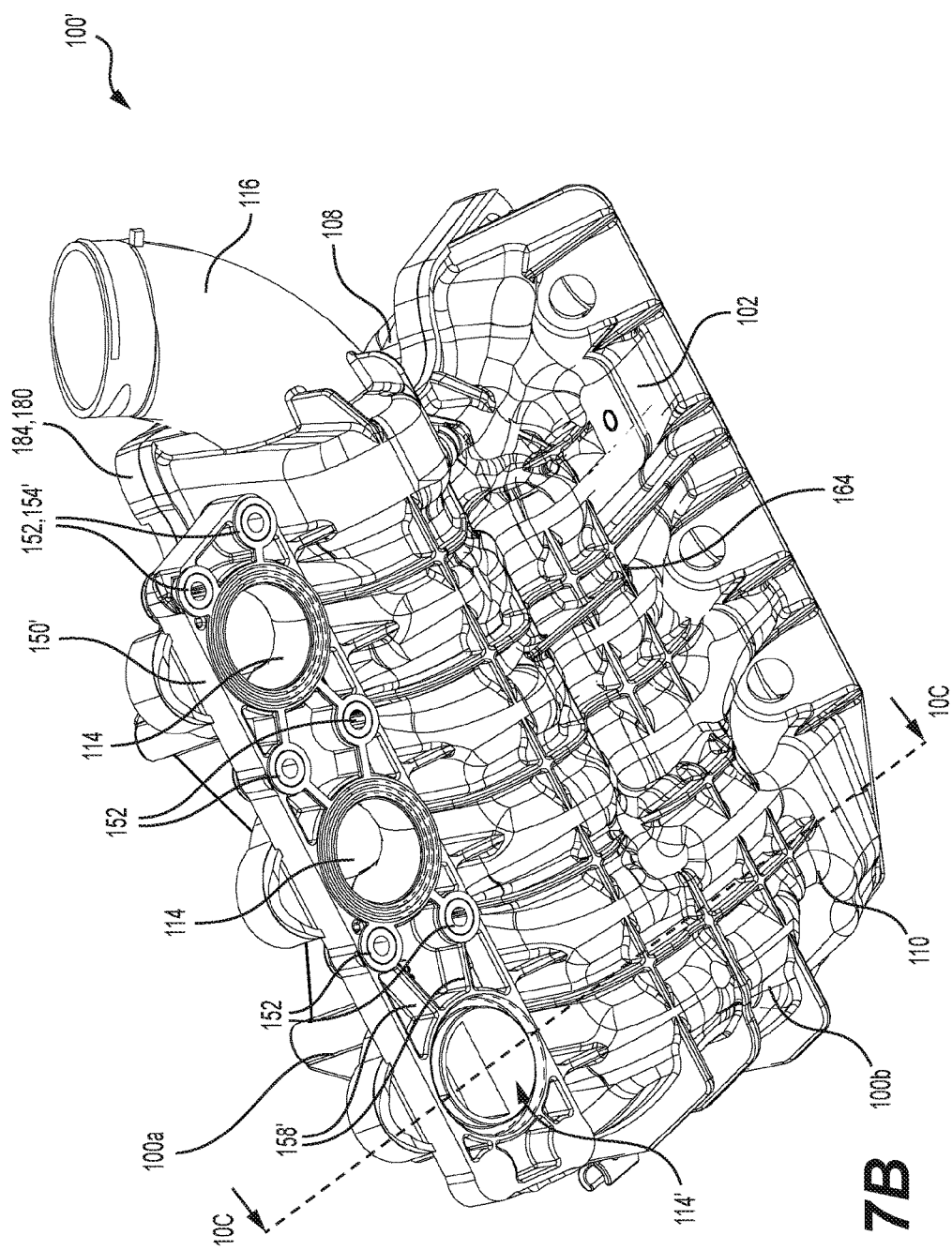
FIG. 7B is a perspective view, taken from a rear, bottom and left side, of the intake manifold of FIG. 7A.
Figure 8A:
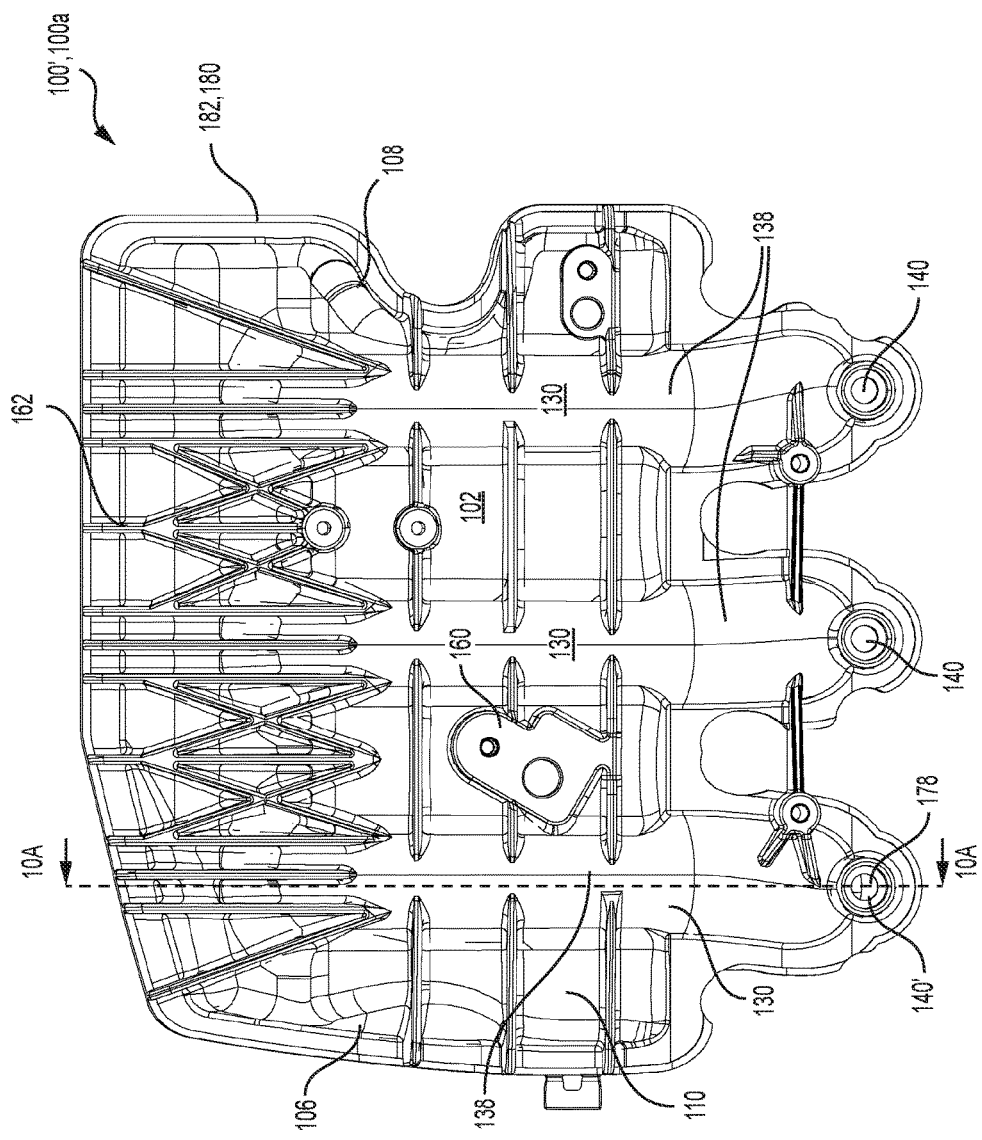
FIG. 8A is a top plan view of a first portion of the intake manifold of FIG. 7A.
Figure 8B:
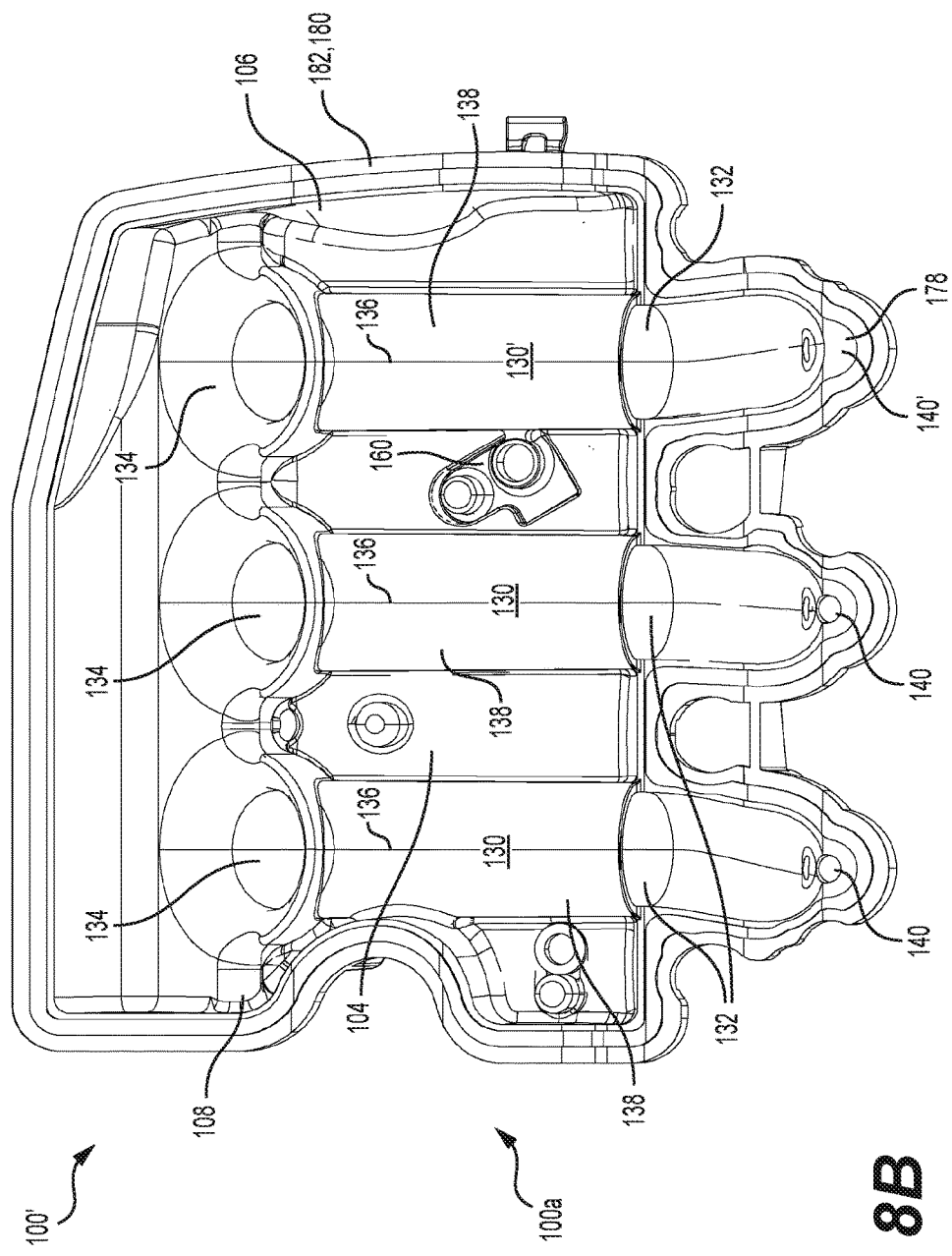
FIG. 8B is a bottom plan view of the first portion of the intake manifold of FIG. 8A.
Figure 9A:
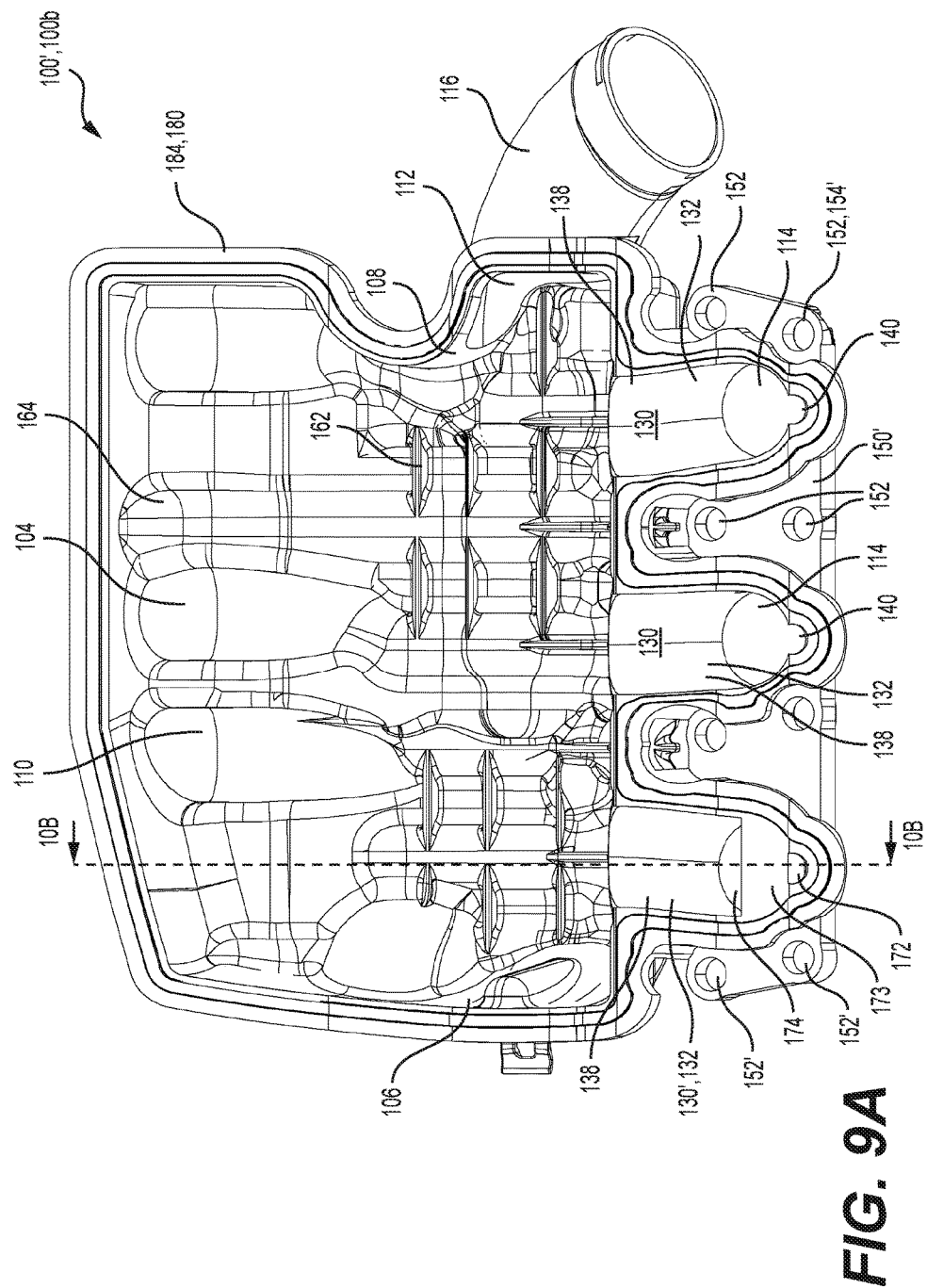
FIG. 9A is a top plan view of a second portion of the intake manifold of FIG. 7A.
Figure 9B:
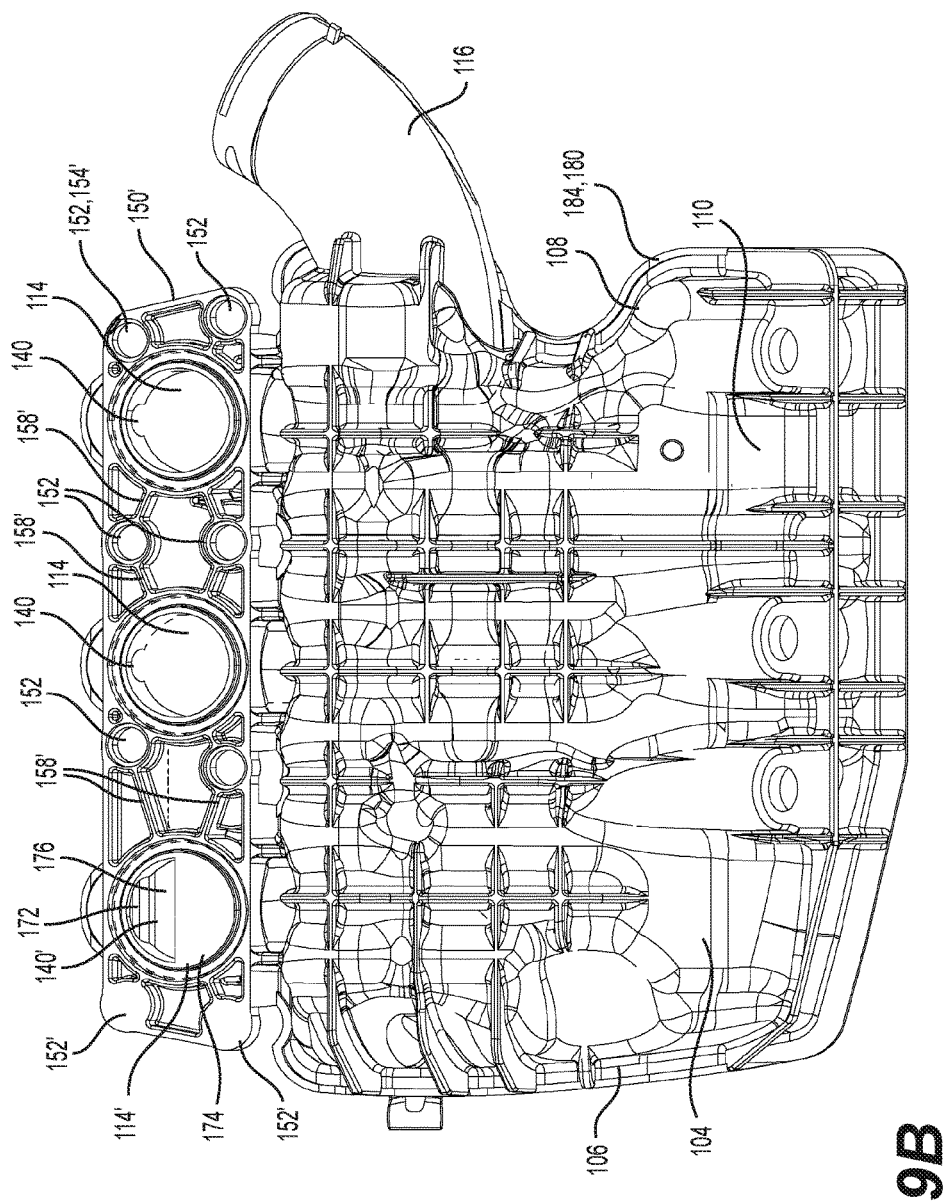
FIG. 9B is a bottom plan view of the second portion of the intake manifold of FIG. 9A.
Figure 10A:
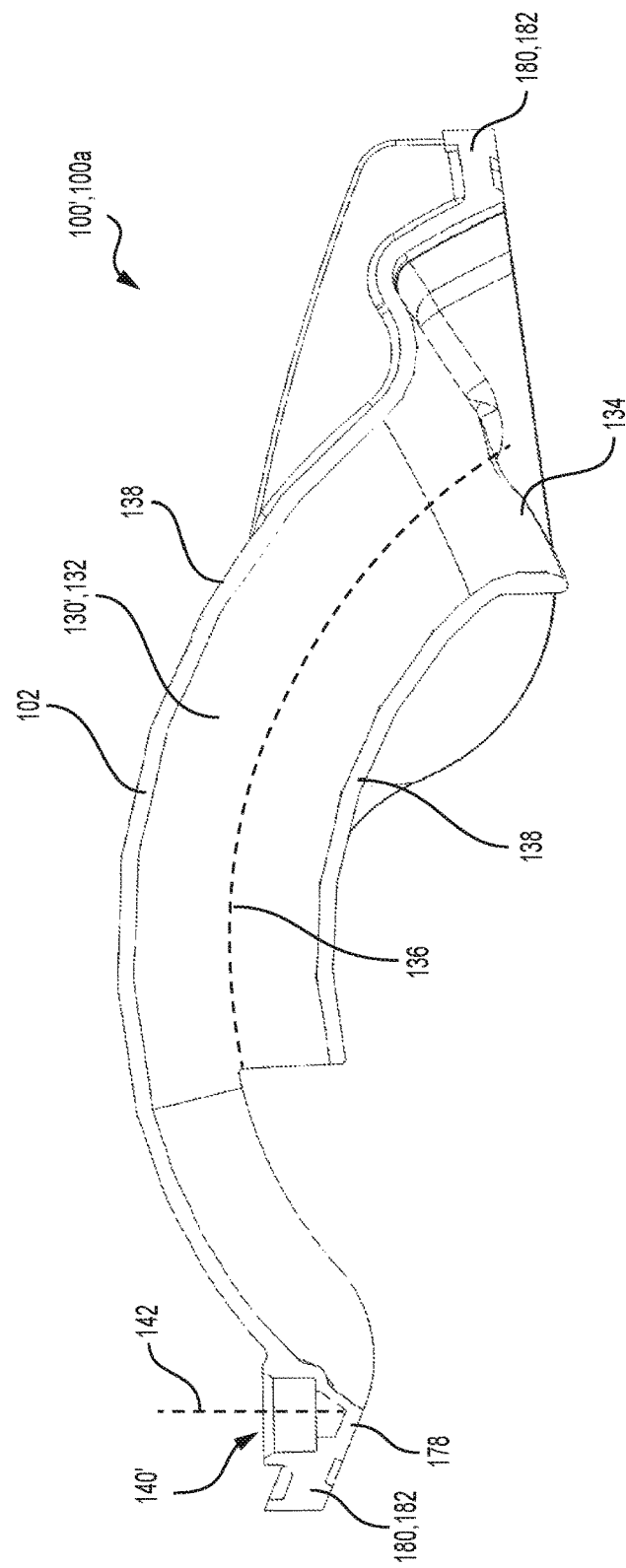
FIG. 10A is a cross-sectional view taken along the line 10A-10A of FIG. 8A.
Figure 10B:
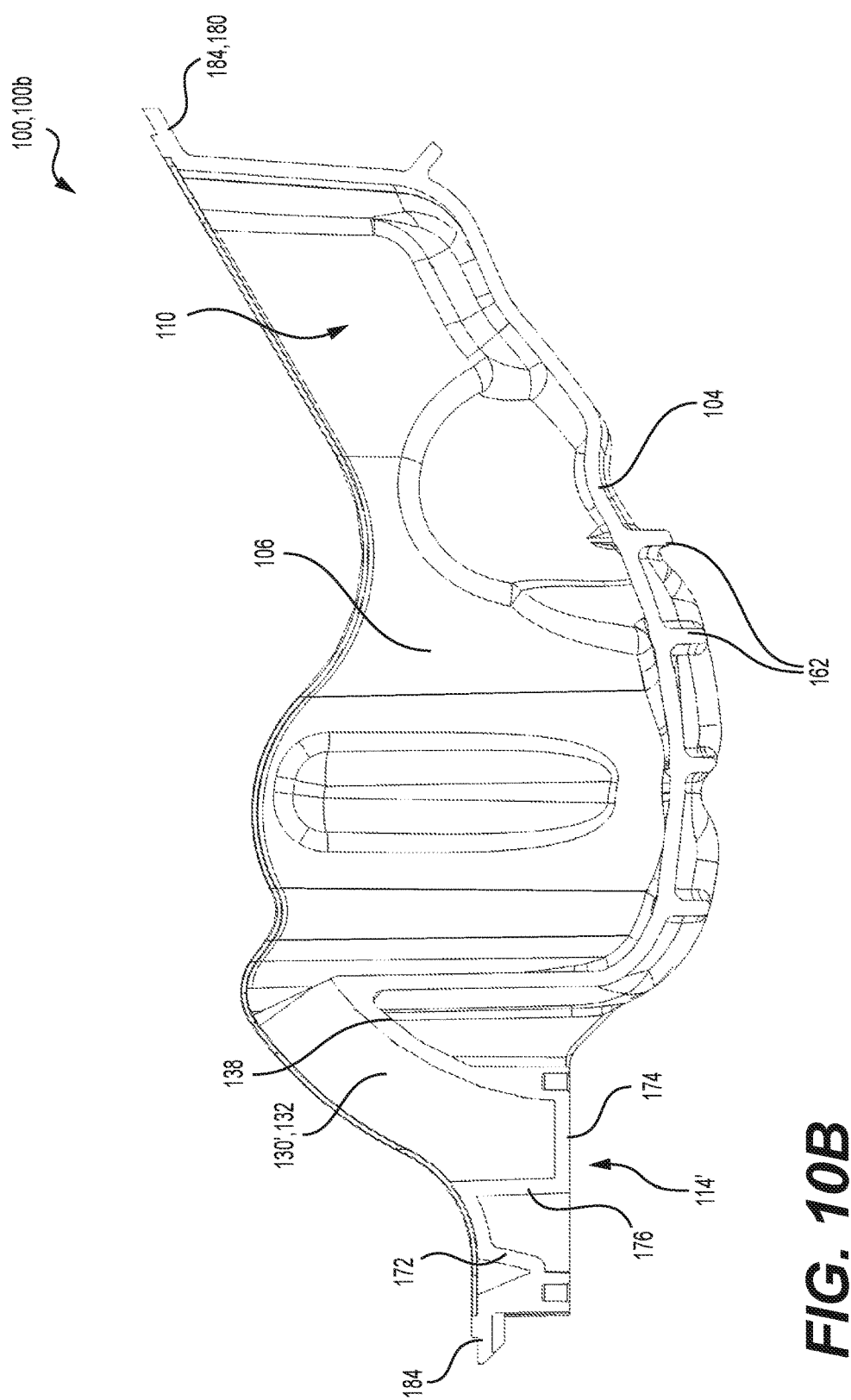
FIG. 10B is a cross-sectional view taken along the line 10B-10B of FIG. 9A.
Figure 10C:
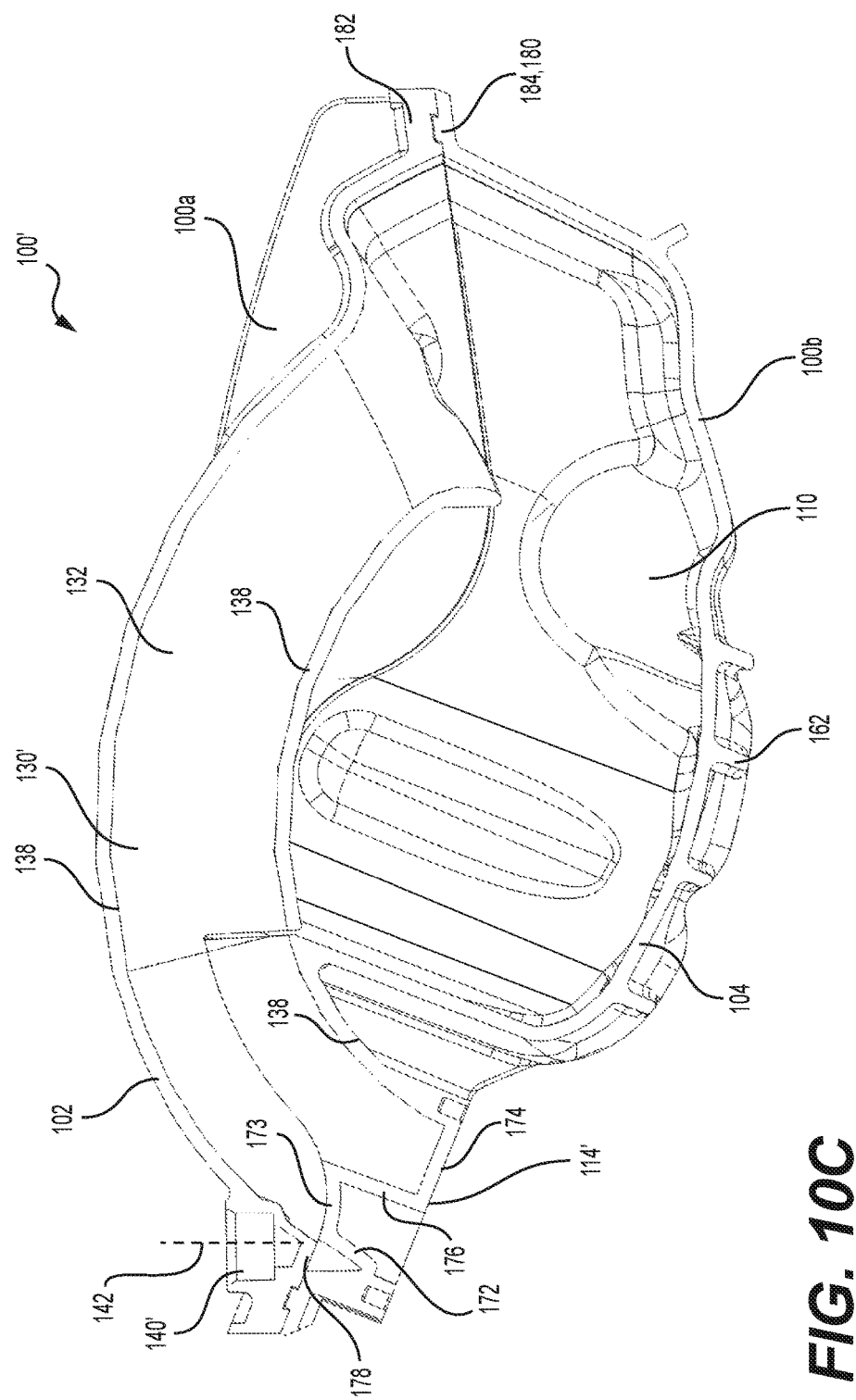
FIG. 10C is a cross-sectional view taken along the line 10C-10C of FIG. 7A.

The holes 152 of the mounting flange 150' are formed in a mounting hole pattern 154' to mate with a corresponding pattern 154' of mounting holes formed in the cylinder head 16' (see FIG. 2C). The mounting hole pattern 154' includes six mounting holes 152 arranged such that each open outlet 114 has two mounting holes 152 on either side thereof as in the mounting flange 150. Two shallow recesses 152' which are not through-holes are defined on the side of the closed outlet 114' that is farther away from the open outlet 114. The recesses 152' are not formed as through-holes 152 as the cylinder head 16' does not have any corresponding mounting holes. It is contemplated that these recesses 152' on the side of the closed outlet 114' farther away from the open outlet 114 could be omitted. It is also contemplated that the mounting flange 150' could not extend on the side of the closed outlet 114' farther away from the open outlet 114.

It is contemplated that the mounting holes pattern 154' could be different than shown herein. For example, the number and/or location of the mounting holes 152 could be different than as shown herein. It is also contemplated that the mounting flange 150' could have the same mounting hole pattern 154 as the mounting flange 150.

Manufacturing of Intake Manifolds

A method for manufacturing the family of intake manifolds 100, 100' will now be described with reference to FIGS. 11A to 12D. The intake manifolds 100, 100' are manufactured by injection molding using a system 400.

Each intake manifold 100, 100' is molded as two separate portions 100a, 100b that are joined together to create the intake manifold 100, 100'.

With reference to FIGS. 4A, 4B, 8A and 8B, in the illustrated implementation, the first portion 100a of each intake manifold 100, 100' includes the upper wall 102, an outer portion of each of the fuel injector ports 140, 140', and a first portion of each of the runners 130, 130' including the runner inlets 134 and a portion of the runner passages 132 extending therefrom. In the illustrated implementation, the first portion 100a of the intake manifold 100, 100' includes a first portion of the plenum chamber 110. The first portion 100a has a reinforced rim 182 that forms a part of the weld line 180. A first intake mold 200 (FIGS. 11A to 11C) is used to mold each of the first portions 100a of the intake manifolds 100, 100'.

With reference to FIGS. 5A, 5B, 9A and 9B, in the illustrated implementation, the second portion 100b of the intake manifold 100, 100' includes the lower wall 104, the front wall 106 and the rear wall 108. In the illustrated implementation, the second portion 100b includes the air inlet 112, the intake conduit 116, a second portion of each of the runners 130, 130', each of the outlets 114, 114', an inner portion of each of the fuel injector ports 140, 140' and the mounting flange 150, 150'. In the illustrated implementation, the second portion 100b of the intake manifold 100, 100' includes a second portion of the plenum chamber 110. The second portion 100b has a reinforced rim 184 that forms a part of the friction welding line 180. A second intake mold 300 (FIGS. 12A to 12E) is used to mold the second portions 100b of the intake manifolds 100, 100'.

It is contemplated that the first portion 100a and the second portion 100b could be configured differently than as shown herein. In the illustrated implementation of the intake manifolds 100, 100', the first portion 100a is an upper portion (the portion facing generally upwardly away from the cylinders 20, 20') and the second portion 100b is a lower portion (the portion facing generally downwardly toward the cylinders 20, 20') of the intake manifold 100, 100'. It is however contemplated that the intake manifold 100, 100' could comprise two separate portions 100a, 100b that are other than the upper and lower portions as shown herein. For example, the first and second portions 100a, 100b could be respectively a front and rear portion of intake manifolds 100, 100'. As another example, the first and second portions 100a, 100b could be respectively a laterally inner portion and a laterally outer portion where the laterally inner portion is disposed closer to the cylinders 20, 20' than the laterally outer portion. It is also contemplated that the parts of the intake manifold 100, 100' included in each of the two portions 100a, 100b could be different from that shown herein.

The system 400 for manufacturing the intake manifolds 100 includes the first intake mold 200, the second intake mold 200 and an injection molding apparatus for use with the first and second intake molds 200, 300.

The method of manufacturing the intake manifold 100 using the first intake mold 200 and the second intake mold 300 will first be described below. Thereafter, the method of manufacturing the intake manifold 100' using the first intake mold 200 and the second intake mold 300 will be described with respect to differences from the method for manufacturing the intake manifold 100.

The first intake mold 200 includes a first cavity portion 210 (FIG. 11A) and a first core portion 220 (FIG. 11B) which are pressed together (hydraulically, in the illustrated implementation) and filled with molten material (plastic, in the illustrated implementation) to form the first portion 100a of the intake manifold 100.

Figure 11A:
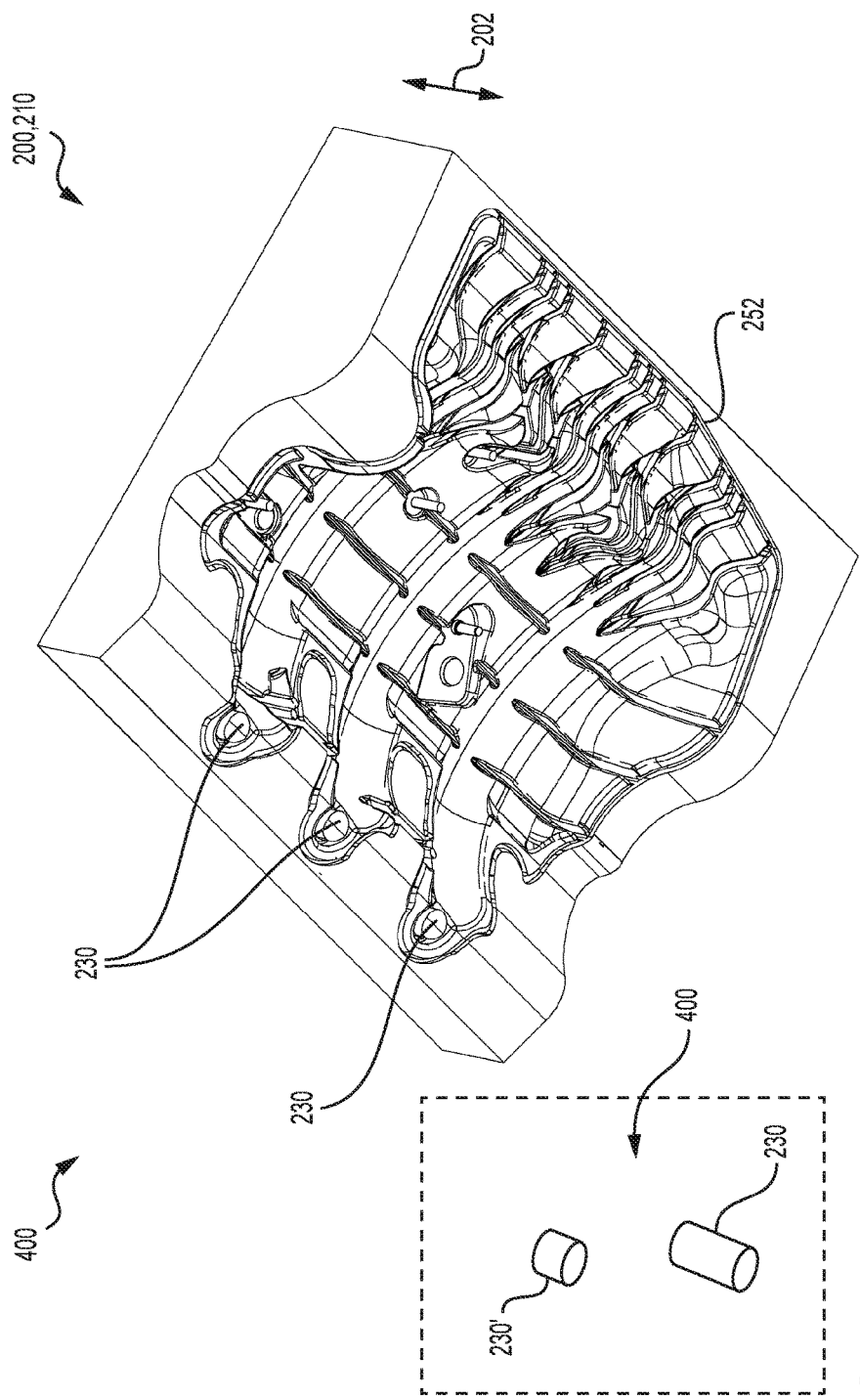
FIG. 11A is a perspective view, taken from a rear, bottom and left side, of a cavity portion of a first intake mold for forming the first portions of the intake manifolds of FIGS. 4A, 4B, 8A and 8B.

With reference to FIG. 11A, the first cavity portion 210 has a shape complementary to the outer surface of the upper wall 102 of the intake manifold 100. The first cavity portion 210 defines the mounting bracket 160 and ribs 162 on the outer surface of the upper wall 102.

The first cavity portion 210 also defines the outer portion of the fuel injector ports 140, 140'. To that end, in the illustrated implementation, the first cavity portion 210 includes three outer port open inserts 230 which are used to define the three open fuel injector ports 140 of the intake mold 100. In the illustrated implementations, the three outer port open inserts 230 are provided as three separate inserts 230 that have to be installed in the first cavity portion 210 individually. It is however contemplated that the outer port open inserts 230 could be configured differently than as shown herein. For example, all three of the outer port open inserts 230 could be provided as one integral insert including three projections for forming the three open fuel injector ports 140. As another example, the three open fuel injector ports 140 could be formed using two inserts, one outer port insert would have two projections 230 for forming two open fuel injector ports 140, while the third open fuel injector port 140 could be formed by a separate outer port open insert 230.

The first cavity portion 210 has a recess 252 for defining the reinforced rim 182 of the first portion 100a.

Figure 11B:
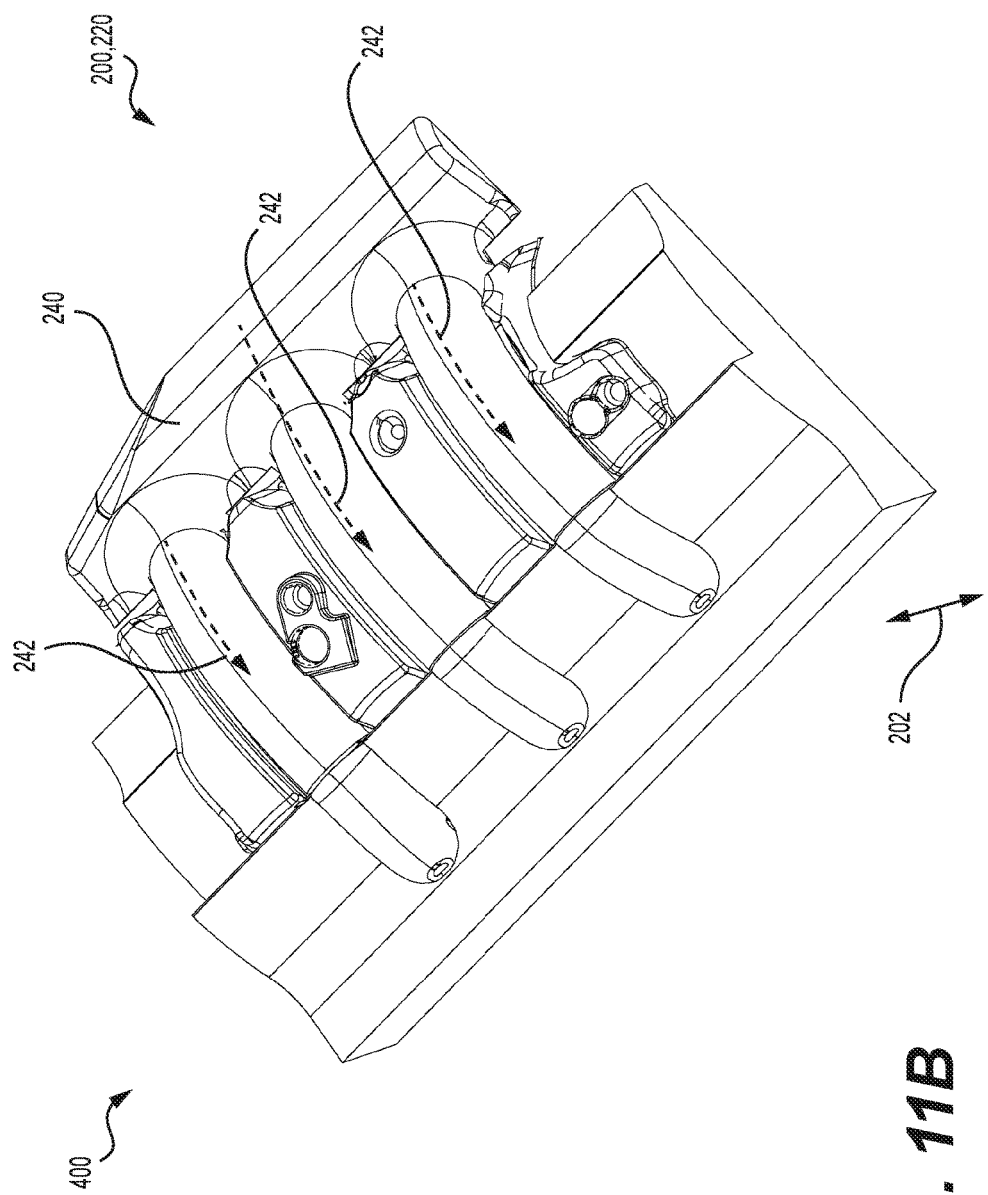
FIG. 11B is a perspective view, taken from a rear, top and left side, of a core portion of the first intake mold for forming the first portions of the intake manifolds of FIGS. 4A, 4B, 8A and 8B.

With reference to FIGS. 11B and 11C, the first core portion 220 has a shape complementary to the inner surface of the upper wall 102 of the intake manifold 100. The first core portion 220 defines the runner inlet 134 and a portion of the runner passage 132 extending therefrom for each of the three intake runners 130. To this end, the first core portion 220 includes a rotary slider 240 for defining the curved intake runners 130. The rotary slider 240 rotates with respect to the first core portion 220 in a direction 242 following the central axis 136 of the runner passages 132. The direction 242 of rotation of the rotary slider 240 is transverse to the direction 202 of opening of the first intake mold 200.

The first portion 100a of the intake manifold 100 is formed by inserting the three outer port open inserts 230 in the first cavity portion 210, clamping the first core portion 220 against first cavity portion 210, and then rotating the rotary slider 240 into the first core portion 220. Once the first cavity and core portions 210, 220 are clamped to each other and the slider 240 is positioned in the first core portion 220, molten material is injected into the first intake mold 200. After the injected molten material has cooled and set, the rotary slider 240 is withdrawn from the first core portion 220, and the first core portion 220 is moved away from the first cavity portion 210 to release the formed first portion 100a of the intake manifold 100.

With reference to FIGS. 12A to 12D, the second intake mold 300 includes a second cavity portion 310 and a second core portion 320 which are pressed together (hydraulically, in the illustrated implementation) and filled with molten material (plastic, in the illustrated implementation) to form the second portion 100b of the intake manifold 100.

Figure 12A:
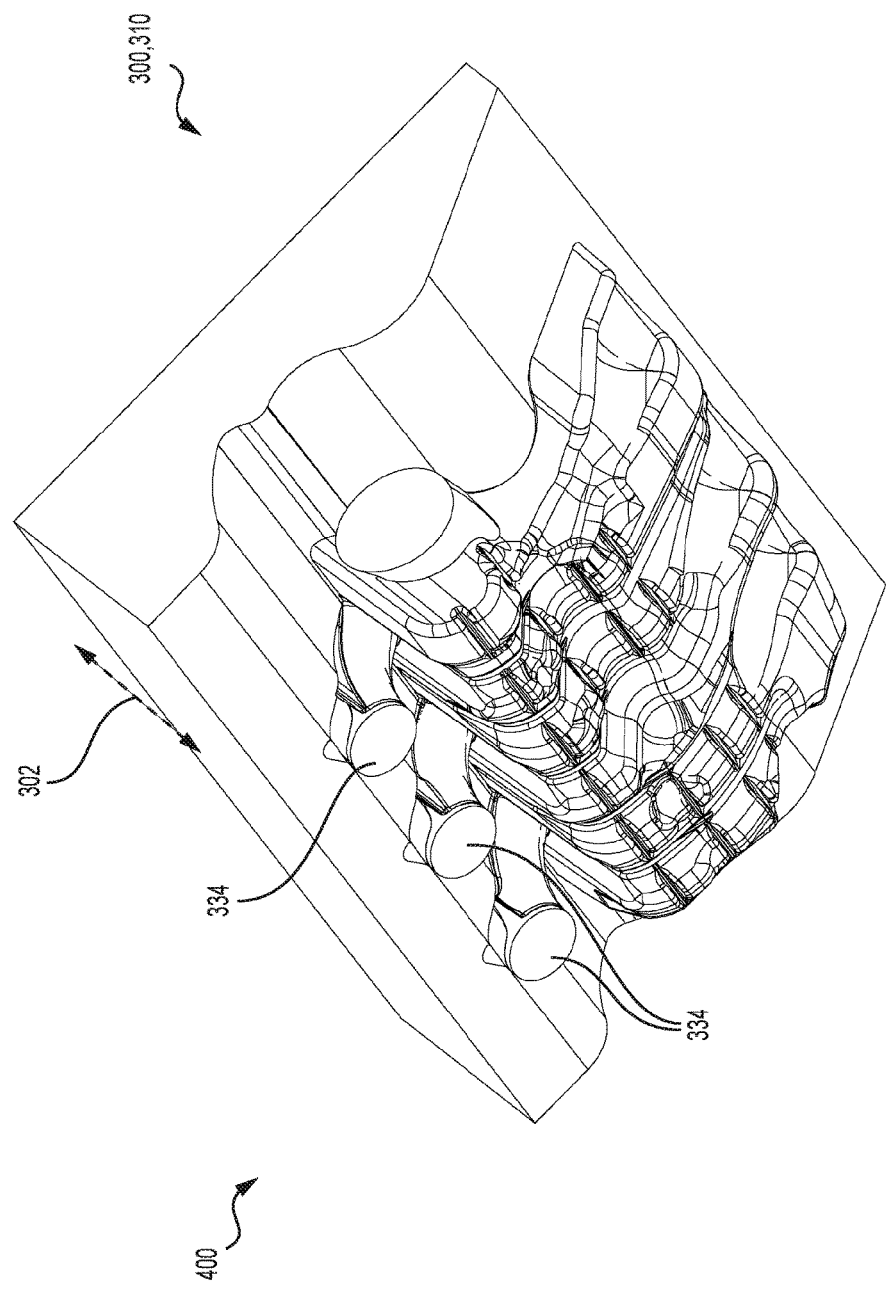
FIG. 12A is a perspective view, taken from a rear, bottom and left side, of a cavity portion of a second intake mold for forming the second portions of the intake manifolds of FIGS. 5A, 5B, 9A and 9B.

With reference to FIG. 12A, the second cavity portion 310 has a shape complementary to the inner surfaces of the lower wall 104, the front wall 106 and the rear wall 108 of the intake manifold 100. The second core portion 310 has three projections 334. Each projection 334 is complementary to a portion of an intake runner 130 extending from the outlet 114 and an inner portion of a fuel injector port 140 where the fuel injector port 140 connects to the passage 132.

Figure 12B:
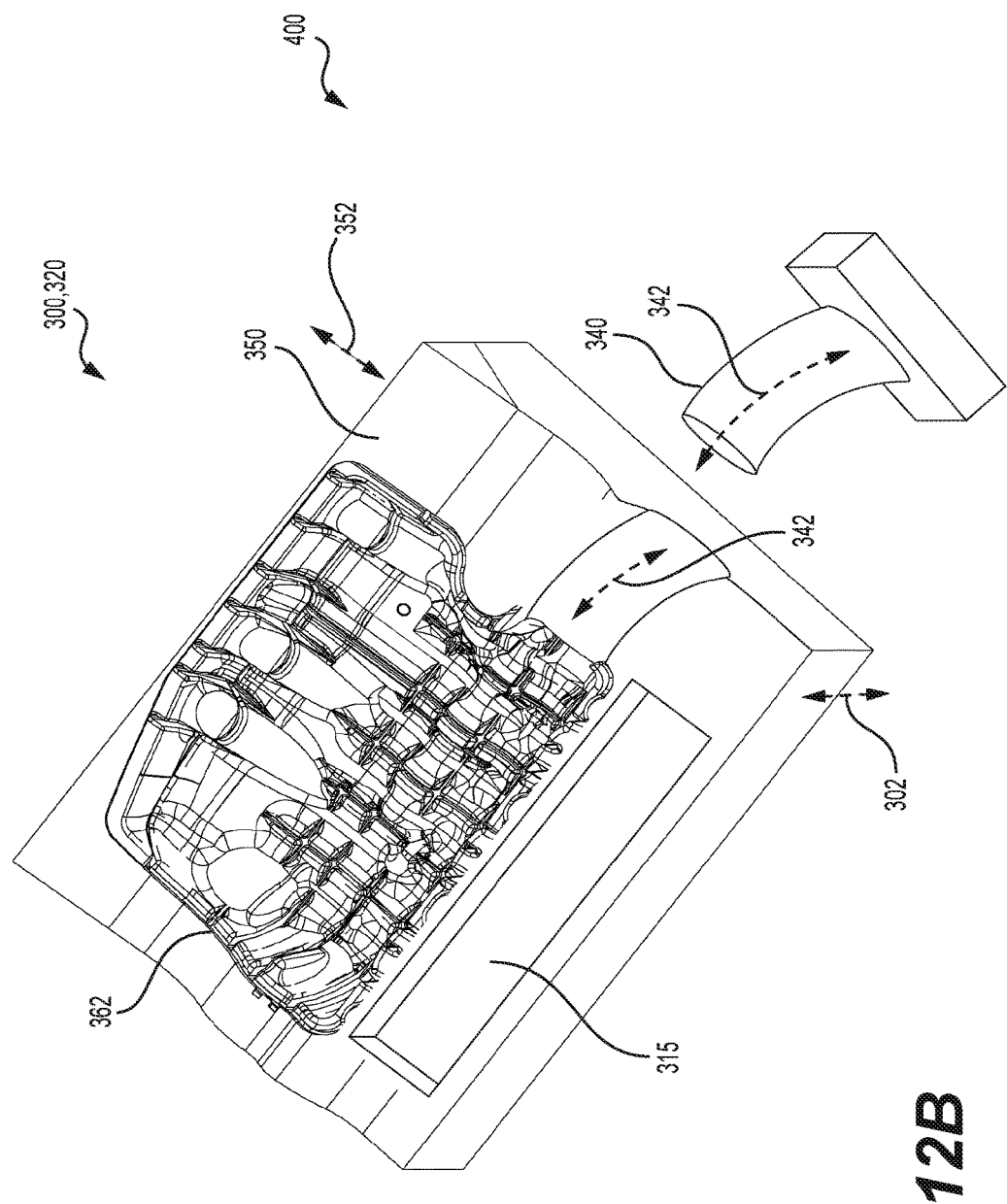
FIG. 12B is a perspective view, taken from a rear, top and left side, of a core portion of the second intake mold for forming the second portions of the intake manifolds of FIGS. 5A, 5B, 9A and 9B.

With reference to FIG. 12B, the second core portion 320 has a shape complementary to the outer surfaces of the lower wall 104, the front wall 106 and the rear wall 108 of the intake manifold 100.

The second core portion 310 has a recess 362 for defining the reinforced rim 184 of the second portion 100b.

The second core and cavity portions 310, 320 also define the air inlet 112 and the intake conduit 116. To this end, the second core portion 320 includes a rotary slider 340 for defining the air inlet 112 and the intake conduit 116. The rotary slider 340 rotates with respect to the second core portion 320 in a direction 342. The direction 342 of rotation of the rotary slider 440 is transverse to the direction 302 of opening of the second intake mold 300.

Additionally, as can be seen in FIG. 12B, the second core portion 320 includes a linear slider 350 for defining a right side portion of the second portion of the intake manifold 100. The linear slider 350 is moved in a direction 352 that is transverse to the direction 302 of opening of the second intake mold 300.

Figure 12C:
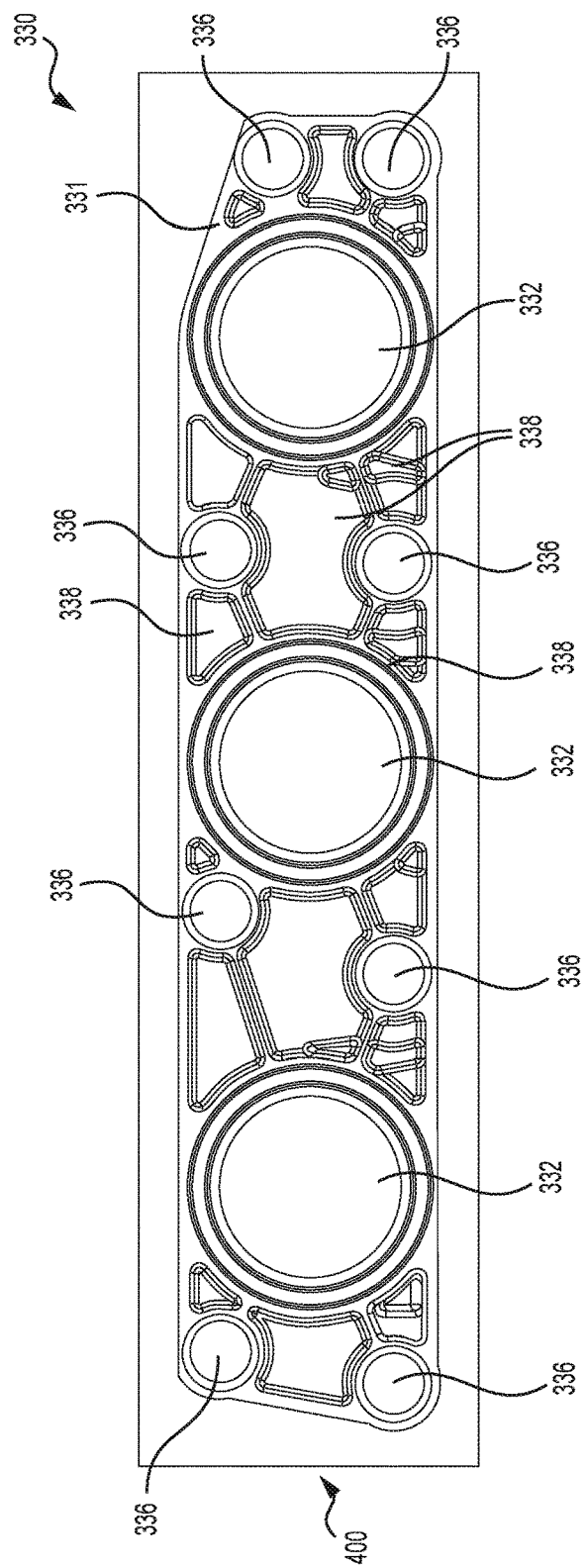
FIG. 12C is a schematic top plan view of an insert used with the second intake mold of FIG. 12B for forming the second portions of the intake manifold of FIGS. 5A and 5B.
Figure 12D:
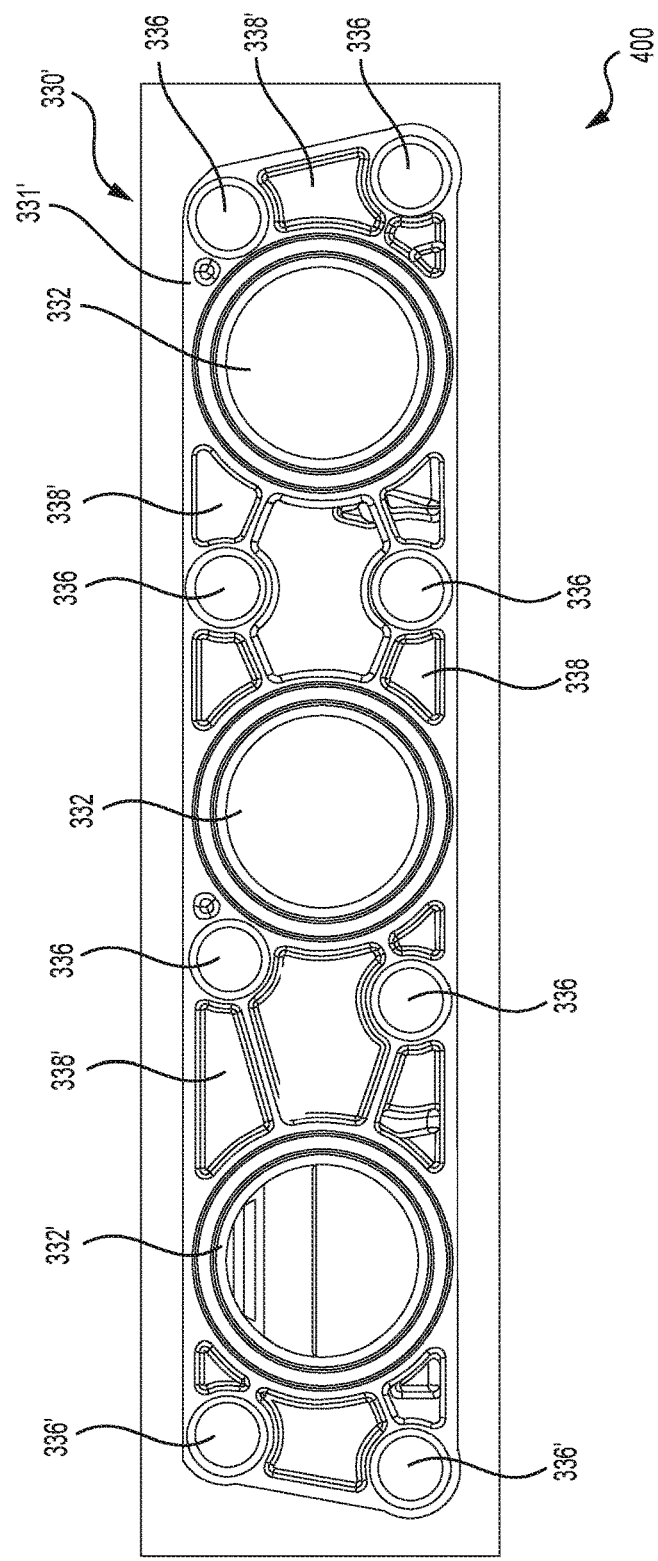
FIG. 12D is a schematic top plan view of an insert used with the second intake mold of FIG. 12B for forming the second portions of the intake manifold of FIGS. 9A and 9B.

As can be seen in FIG. 12B, the second core portion 320 includes a recess 315 for receiving an insert 330 (FIG. 12C). The insert 330 of the second core portion 320 is for defining the mounting flange 150, the inner portions of the fuel injector ports 140 and the outlets 114.

With reference to FIG. 12C, the insert 330 includes a recess 331 in the shape of the mounting flange 150. The insert 330 also includes, within the recess 331, three projections 332 complementary to the projections 334 of the second cavity portion 310, eight cylindrical projections 336 for defining the mounting holes 152, and several projections 338 for defining the ribs 158 of the mounting flange 150. Each projection 332 is configured to form, in conjunction with the projections 334, an outlet 114 and the inner portion of one of the fuel injector ports 140. The upper surface of each projection 332 is configured to be complementary to and to contact the lower surface of the projections 334 of the second cavity portion 310. When the second core portion 320 is clamped to the second cavity portion 310, each projection 332 is in contact with a corresponding projection 334 thereby forming an open fuel injector port 140 and an open outlet 114.

It is contemplated that instead of having a single integral insert 330 that defines all of the outlets 114, all of the mounting holes 152, mounting flange ribs 158 and the inner portions of the fuel injector ports 140, separate inserts in the form of an outlet insert, a mounting flange insert and a fuel injector port insert could be provided. For example, an outlet insert could have one or more projections 332 for forming one or more outlets 114. A mounting flange insert could have the recess 331, one or more projections 336 and one or more projections 338 for forming the mounting flange 150 having the mounting holes 152 and ribs 158. A fuel injector port insert could have one or more projections similar to the projections 332 for defining the fuel injector ports.

The second portion 100b of the intake manifold 100 is formed by inserting the insert 330 in the second core portion 210 and clamping the second core portion 320 against second cavity portion 310. Once the second core and cavity portions are clamped to each other, the rotary slider 340 is rotated into the second core portion 320 and the linear slider 350 is moved into the second core portion 320. Once the sliders 340, 350 are in place in the second core portion 320, molten material is injected into the second intake mold 300 to form the second portion 100b of the intake manifold 100. After the injected molten material has cooled and set, the sliders 340, 350 are withdrawn from the second core portion 320, and the second core portion 320 is moved away from the second cavity portion 310 to release the formed second portion 100b of the intake manifold 100.

Finally, the first portion 100a is joined to the second portion 100b by their respective rims 182, 184 to form the closed hollow structure of the intake manifold 100. In the illustrated implementation, the portions 100a, 100b are joined together by friction welding the rims 182, 184. It is however contemplated that the portions 100a, 100b could be joined together by other means.

The intake manifold 100' is formed using the first and second intake molds 200, 300 in the same way as described above except for replacing some of the inserts as will be described below.

When forming the first portion 100a of the intake manifold 100' with the first intake mold 200, the first one of the three outer port open inserts 230 is replaced by an outer port closed insert 230' (FIG. 11A) for defining an outer portion of the closed fuel injector port 140' of the intake manifold 100'. The closed port insert 230' is shorter in length than the open port insert 230 so as to form the wall 178 (FIGS. 10A and 10C) preventing the fuel injector port 140' from extending to the runner passage 132.

When forming the second portion 100b of the intake manifold 100' with the second intake mold 300, the insert 330 is replaced with an insert 330'. The insert 330' has two of the three projections 332 of the insert 330 and a closed port projection 332' instead of the third projection 332.

The closed port projection 332' is configured to form the closed outlet 114' and the inner portion of the closed fuel injector port 140'. The upper surface of each projection 332' is configured to be complementary to, but spaced from, the lower surface of the projection 334 of the second cavity portion 310 when the second core portion 320 is clamped to the second cavity portion 310, thereby forming the walls 172, 176, 174 (FIGS. 1B and 10C) to define the closed fuel injector port 140' and the closed outlet 114'.

The insert 330' also includes six cylindrical projections 336 for defining the open mounting holes 152 of the mounting flange 150' and two cylindrical projections 336' for defining the recesses 152' (FIGS. 9A and 9B) of the mounting flange 150'. The projections 338' of the insert 330' are complementary to the ribs 158' (FIG. 9B) of the mounting flange 150', and are thus similar to, but shaped and positioned differently than the projections 338 of the insert 330.

As will be understood, the use of inserts 230, 230', 330, 330' allows flexibility in forming a family of intake manifolds 100, 100' configured to a family of engines 10, 10' without having to use entirely new tooling assemblies.

It is contemplated that the first cavity portion 210 could be configured to form three closed fuel injection ports 140', and inserts (such as the inserts 230) could be used selectively when it is desired to open a particular one of the fuel injection ports 140'.

Similarly, the projections 334 of the second cavity portion 310 could be configured to form three closed outlets 114', and inserts (such as the inserts 332) could be used selectively when it is desired to open a particular one of the outlets 114'.

The above is described using a family of engines where the first engine 10 is a three cylinder engine and the second engine 10' is a two cylinder engine. It is however contemplated that the engines 10, 10' could be other than three and two cylinder engines. For example, the family of engines could include a four-cylinder engine and a two-cylinder engine. It is further contemplated that the family of engines could include more than two engines.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A method for manufacturing a family of intake manifolds including at least a first air intake manifold and a second air intake manifold for a family of engines including at least a first engine and a second engine,
   the first engine including a first number of cylinders,
   the second engine including a second number of cylinders,
   the second number being smaller than the first number,
   the second number being at least one,
   the first intake manifold being configured for the first engine, the first intake manifold comprising a plenum chamber, a plenum chamber air inlet, the first number of intake runner passages, and the first number of outlets, each of the outlets being fluidly connected to a corresponding one of the first number of intake runner passages and being configured for fluid connection to a corresponding one of the first number of cylinders,
   the second intake manifold being configured for the second engine, the second intake manifold comprising the plenum chamber, the plenum chamber air inlet, the first number of intake runner passages, and the second number of outlets, each of the second number of outlets being fluidly connected to a corresponding one of the first number of intake runner passages and being configured for fluid connection to a corresponding one of the second number of cylinders, at least one of the first number of intake runner passages of the second intake manifold not being fluidly connected to any one of the second number of outlets of the second intake manifold,
   the method comprising:
   providing a first intake mold for forming a first portion of each one of the first and second intake manifolds including a first portion of the plenum chamber;
   providing a second intake mold for forming a second portion of each one of the first and second intake manifolds including a second portion of the plenum chamber,
   one of the first and second intake molds comprising an outlet insert for forming at least one of the first number of outlets of the first intake manifold;
   manufacturing the first intake manifold by:
   inserting the outlet insert into the corresponding one of the first and second intake molds;
   forming the first portion of the first intake manifold including the first portion of the plenum chamber using the first intake mold;
   forming the second portion of the first intake manifold including the second portion of the plenum chamber using the second intake mold; and
   connecting the first portion of the first intake manifold to the second portion of the first intake manifold to form the first intake manifold configured for the first engine; and
   manufacturing the second intake manifold by:
   forming the first portion of the second intake manifold including the first portion of the plenum chamber using the first intake mold;
   forming the second portion of the second intake manifold including the second portion of the plenum chamber using the second intake mold; and
   connecting the first portion of the second intake manifold to the second portion of the second intake manifold to form the second intake manifold configured for the second engine.

2. The method of claim 1, wherein:
the first intake manifold comprises the first number of fuel injector ports, each of the first number of fuel injector ports being fluidly connected to a corresponding one of the first number of intake runner passages;
the second intake manifold comprises the second number of fuel injector ports, each of the second number of fuel injector ports being fluidly connected to a corresponding one of the first number of intake runner passages;
one of the first and second intake molds further comprises a fuel injector port insert for forming at least one of the first number of fuel injector ports of the first intake manifold; and
manufacturing the first intake mold further comprises inserting the fuel injector port insert into the corresponding one of the first and second intake molds before forming the corresponding one of the first and second portions of the first intake manifold using the corresponding one of the first and second intake molds.

3. The method of claim 2, wherein:
the fuel injector port insert is a first fuel injector port insert configured for defining at least one of the first number of fuel injector ports of the first intake manifold;
one of the first and second intake molds further comprises a second fuel injector port insert configured for defining at least one of the second number of fuel injector ports of the second intake manifold, the second fuel injector port insert being different from the first fuel injector port insert; and
manufacturing the second intake mold further comprises inserting the second fuel injector port insert into the corresponding one of the first and second intake molds before forming the corresponding one of the first and second portions of the second intake manifold using the corresponding one of the first and second intake molds.

4. The method of claim 3, wherein:
the second intake manifold further comprises at least one closed fuel injector port corresponding to one of the first number of intake runner passages; and
the second fuel injector port insert comprises a closed fuel injector port insert for defining the at least one closed fuel injector port.

5. The method of claim 1, wherein:
the outlet insert is a first outlet insert configured for defining at least one of the first number of outlets of the first intake manifold;

one of the first and second intake molds further comprises a second outlet insert configured for defining at least one of the second number of outlets of the second intake manifold, the second outlet insert being different from the first outlet insert; and manufacturing the second intake mold further comprises inserting the second outlet insert into the corresponding one of the first and second intake molds before forming the corresponding one of the first and second portions of the second intake manifold using the corresponding one of the first and second intake molds.

6. The method of claim 5, wherein:

the second intake manifold further comprises at least one closed outlet corresponding to one of the first number of intake runner passages and configured to block connection of the corresponding one of the first number of intake runner passages to any one of the second number of cylinders; and the second outlet insert comprises a closed outlet insert for defining the at least one closed outlet.

7. The method of claim 1, wherein:

one of the first and second intake molds further comprises an intake runner slider for defining at least a portion of the first number of intake runner passages;

manufacturing the first intake manifold further comprises moving the intake runner slider in a direction transverse to a direction of opening of the corresponding one of the first and second intake molds before forming the corresponding one of the first and second portions of the first intake manifold using the corresponding one of the first and second intake molds; and manufacturing the second intake manifold further comprises moving the intake runner slider in the direction transverse to the direction of opening of the corresponding one of the first and second intake molds before forming the corresponding one of the first and second portions of the second intake manifold using the corresponding one of the first and second intake molds.

8. The method of claim 7, wherein the intake runner slider is a rotary slider and moving the intake runner slider comprises rotating the intake runner slider about an axis of rotation disposed transverse to the direction of opening of the corresponding one of the first and second intake molds.

9. The method of claim 1, wherein:

the first intake manifold further comprises a first pattern of holes for mounting the first intake manifold to the first engine; and the second intake manifold further comprises a second pattern of holes for mounting the second intake manifold to the second engine, the second pattern of holes being different from the first pattern of holes, and one of the first and second intake molds further comprises a flange insert for use with one of the first and second intake molds for defining at least a portion of the first pattern of holes; and manufacturing the first intake manifold comprises:
inserting the flange insert in the corresponding one of the first and second intake molds before forming the corresponding one of the first and second portions of the first intake mold using the corresponding one of the first and second intake molds.

10. The method of claim 9, wherein:

the flange insert is a first flange insert configured to define at least the portion of the first pattern of holes;

one of the first and second intake molds further comprises a second flange insert configured for use with one of the first and second intake molds for defining at least a portion of the second pattern of holes, the second flange insert being different from the first flange insert; and manufacturing the second intake manifold further comprises:
inserting the second flange insert in the corresponding one of the first and second intake molds before forming the corresponding one of the first and second portions of the second intake manifold using the corresponding one of the first and second intake molds.

11. The method of claim 1, wherein:

one of the first and second intake molds comprises an intake manifold defining slider for use with one of the first and second intake molds for defining at least a portion of the first and second intake manifolds;

manufacturing the first intake manifold further comprises moving the intake manifold defining slider in a direction transverse to a direction of opening of the corresponding one of the first and second intake molds before forming the corresponding one of the first and second portions of the first intake manifold using the corresponding one of the first and second intake molds; and manufacturing the second intake manifold further comprises moving the intake manifold defining slider in the direction transverse to the direction of opening of the corresponding one of the first and second intake molds before forming the corresponding one of the first and second portions of the second intake manifold using the corresponding one of the first and second intake molds.

12. The method of claim 1, wherein:

connecting the first portion of the first intake manifold to the second portion of the first intake manifold comprises friction welding the first portion of the first intake manifold to the second portion of the first intake manifold; and connecting the first portion of the second intake manifold to the second portion of the second intake manifold comprises friction welding the first portion of the second intake manifold to the second portion of the second intake manifold.

* * * * *